(12) United States Patent  
Luftglass et al.

(10) Patent No.: US 9,915,444 B2
(45) Date of Patent: Mar. 13, 2018

(54) TRANSLUCENT PLASTIC SOLAR THERMAL COLLECTOR

(71) Applicant: Helios Products, LLC, Montclair, NJ (US)

(72) Inventors: Murray A. Luftglass, Montclair, NJ (US); Louis Taschek, Voorhees, NJ (US); Clayton C. Gunheim, Hopelawn, NJ (US); Kevin D. Dahm, Sewell, NJ (US)

(73) Assignee: HELIOS PRODUCTS, LLC, Montclair, NJ (US)

( * ) Notice: Subject to any disclaimer, the term of this patent is extended or adjusted under 35 U.S.C. 154(b) by 340 days.

(21) Appl. No.: 14/774,611

(22) PCT Filed: Mar. 7, 2014

(86) PCT No.: PCT/US2014/021601
§ 371 (c)(1),
(2) Date: Sep. 10, 2015

(87) PCT Pub. No.: WO2014/164269
PCT Pub. Date: Oct. 9, 2014

(65) Prior Publication Data
US 2016/0025381 A1    Jan. 28, 2016

Related U.S. Application Data

(60) Provisional application No. 61/779,274, filed on Mar. 13, 2013.

(51) Int. Cl.
*F24J 2/05* (2006.01)
*F24J 2/20* (2006.01)
(Continued)

(52) U.S. Cl.
CPC .................. *F24J 2/05* (2013.01); *B23P 15/26* (2013.01); *F24J 2/20* (2013.01); *F24J 2/201* (2013.01);
(Continued)

(58) Field of Classification Search
CPC .................................................. F24J 2002/241
(Continued)

(56) References Cited

U.S. PATENT DOCUMENTS 4,056,092 A    11/1977    Meier et al.
4,085,732 A    4/1978    Hysom
(Continued)

FOREIGN PATENT DOCUMENTS

CN    101087980 A    12/2007
CN    101398226 A    4/2009
(Continued)

OTHER PUBLICATIONS

Chinese Patent Office Action for Application No. 201480021898.9 dated Nov. 14, 2016 (12 pages).
(Continued)

*Primary Examiner* — Avinash Savani
(74) *Attorney, Agent, or Firm* — Michael Best & Friedrich LLP

(57) ABSTRACT

Our invention consists of two separate and discrete families of polymers, e.g. thermosetting Fiberglass Reinforced Plastics ("FRP") and thermoplastics. Both are used as the materials of construction to fabricate solar thermal collectors. These families have the same general configuration and are based upon the same principles. Both families are used in a form that some of the walls of the collector are translucent. Both families incorporate a passage through which the thermal fluid flows. Both families make use of dyes to absorb energy from the sun in the fluid and the (Continued)

collector walls. Each of the families makes use of improved collector configurations and designs and special operating approaches. Each family can serve different markets for different solar thermal collectors. In particular, FRP stands alone as an emerging new category of materials for a broad range of applications including everything from novel solar thermal collectors to exotic airplanes.

21 Claims, 26 Drawing Sheets

(51) Int. Cl.
 *F24J 2/24* (2006.01)
 *F24J 2/46* (2006.01)
 *B23P 15/26* (2006.01)
 *F24J 2/50* (2006.01)
 *F24D 17/00* (2006.01)

(52) U.S. Cl.
 CPC .............. *F24J 2/202* (2013.01); *F24J 2/24* (2013.01); *F24J 2/242* (2013.01); *F24J 2/243* (2013.01); *F24J 2/4641* (2013.01); *F24J 2/4643* (2013.01); *F24J 2/506* (2013.01); *F24D 17/0068* (2013.01); *F24D 2200/04* (2013.01); *F24D 2200/14* (2013.01); *F24J 2002/241* (2013.01); *F24J 2002/4656* (2013.01); *F24J 2002/4692* (2013.01); *Y02B 10/22* (2013.01); *Y02B 10/70* (2013.01); *Y02E 10/44* (2013.01)

(58) Field of Classification Search
 USPC ......................................... 126/640, 646, 652
 See application file for complete search history.

(56) References Cited

U.S. PATENT DOCUMENTS

| | | | |
|---|---|---|---|
| 4,114,597 A | 9/1978 | Erb | |
| 4,120,287 A | 10/1978 | Marles et al. | |
| 4,127,104 A * | 11/1978 | Greene | F24J 2/10 126/400 |
| 4,141,341 A * | 2/1979 | Eby | F24J 2/205 126/656 |
| 4,174,945 A | 11/1979 | Gertz | |
| 4,178,914 A | 12/1979 | Erb | |
| 4,182,308 A * | 1/1980 | Reynolds | F24J 2/204 126/640 |
| 4,221,210 A | 9/1980 | Cvijanovich | |
| 4,232,655 A | 11/1980 | Frissora, Jr. et al. | |
| 4,232,658 A * | 11/1980 | Gessford | F24J 2/265 126/648 |
| 4,239,035 A | 12/1980 | Brooks | |
| 4,263,896 A | 4/1981 | Zebuhr | |
| 4,271,823 A | 6/1981 | Erb | |
| 4,287,883 A | 9/1981 | Kyrias | |
| 4,296,799 A | 10/1981 | Steele | |
| 4,325,359 A | 4/1982 | Fries | |
| 4,341,201 A | 5/1982 | Ziemann | |
| 4,350,145 A | 9/1982 | Bianchini | |
| 4,481,975 A | 11/1984 | Buckley | |
| 4,566,433 A | 1/1986 | Amundsen | |
| 4,572,159 A | 2/1986 | Sodergren et al. | |
| 5,275,150 A | 1/1994 | Lai | |
| 5,460,164 A | 10/1995 | Rekstad et al. | |
| 7,431,030 B2 | 10/2008 | Nocera | |
| 8,124,869 B2 | 2/2012 | Mizuta et al. | |
| 8,381,399 B2 | 2/2013 | Mills | |
| 2002/0011245 A1 | 1/2002 | Fukutake et al. | |
| 2003/0150444 A1 | 8/2003 | Cedenblad | |
| 2004/0035460 A1 | 2/2004 | Gonslorawski | |
| 2006/0063880 A1 | 3/2006 | Khanna | |
| 2006/0130827 A1 | 6/2006 | Opelka et al. | |
| 2009/0095282 A1 | 4/2009 | Cramer | |
| 2010/0179290 A1 | 7/2010 | Lietzau et al. | |
| 2010/0206299 A1 | 8/2010 | Cramer et al. | |
| 2011/0005514 A1 | 1/2011 | Nugent | |
| 2011/0088753 A1 | 4/2011 | Ahlgren et al. | |
| 2011/0139888 A1 | 6/2011 | Levin | |
| 2012/0192920 A1 | 8/2012 | McCowan et al. | |

FOREIGN PATENT DOCUMENTS

| | | |
|---|---|---|
| CN | 101907361 A | 12/2010 |
| DE | 82 00 359 U1 | 5/1982 |
| JP | 2012 242016 | 12/2012 |
| WO | WO 2009/048623 | 4/2009 |
| WO | WO 2014/0164269 A9 | 10/2014 |

OTHER PUBLICATIONS

International Preliminary Report on Patentability for International Application No. PCT/US2014/021601, dated Sep. 15, 2015 in 9 pages.
International Search Report and Written Opinion in Application No. PCT/US2008/011682, dated Dec. 19, 2008 in 8 pages.
Sealed Air; The Hollow Core Profile; dated Nov. 4, 2006; http://www.sealedair.com/products/solar/solarengineer.html.
International Search Report and Written Opinion for International Application No. PCT/US2014/021601, dated Jun. 23, 2004 in 17 pages.
European Search Report in co-pending European Application No. 14778119.9, dated Oct. 17, 2016 in 12 pages.

* cited by examiner

FIG. 7
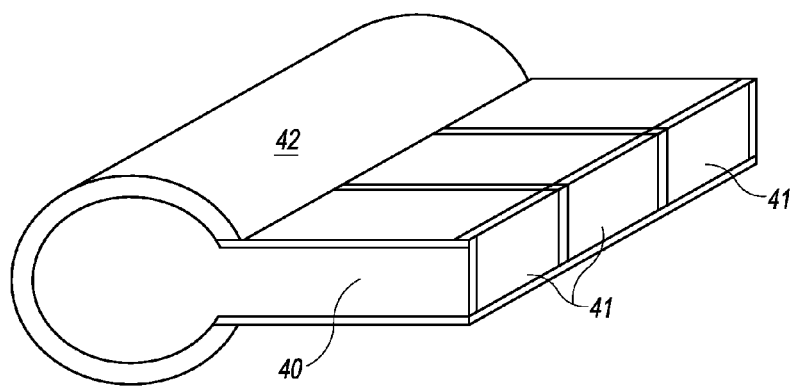
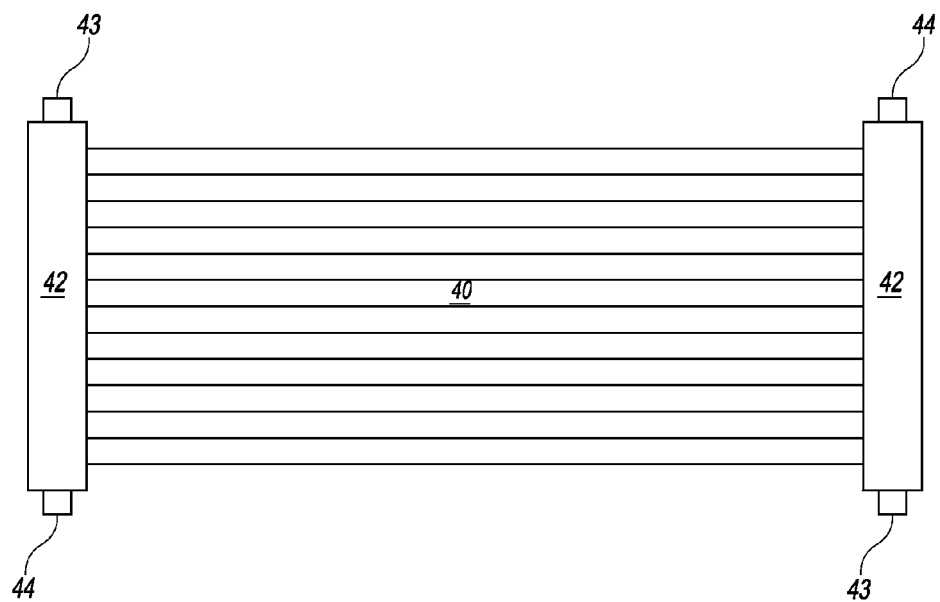

FIG. 8
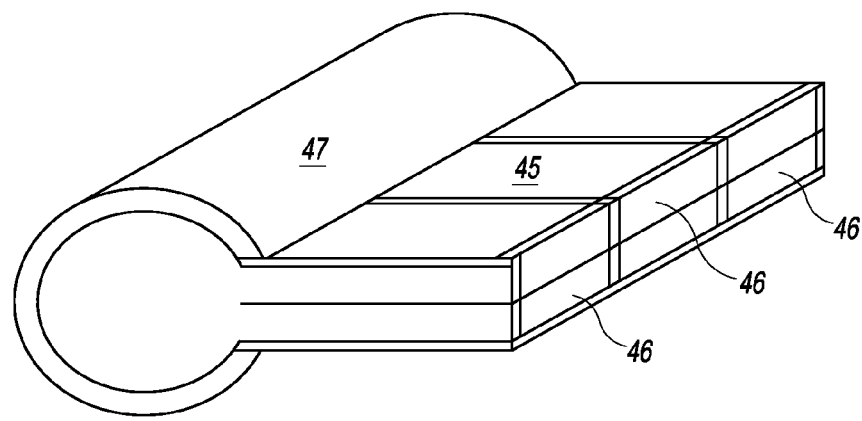
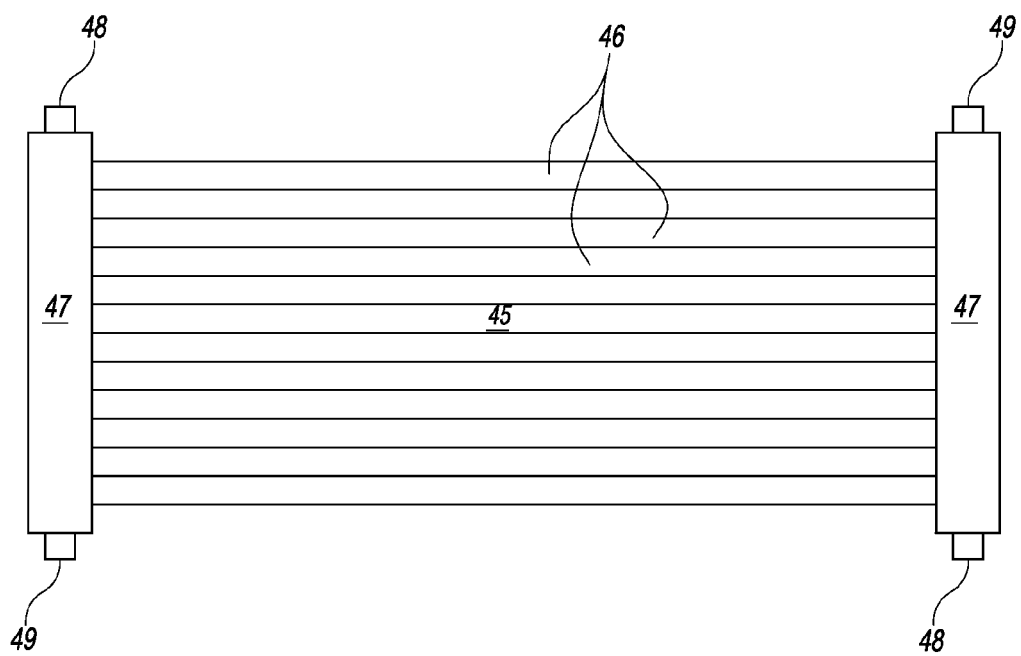

FIG. 27
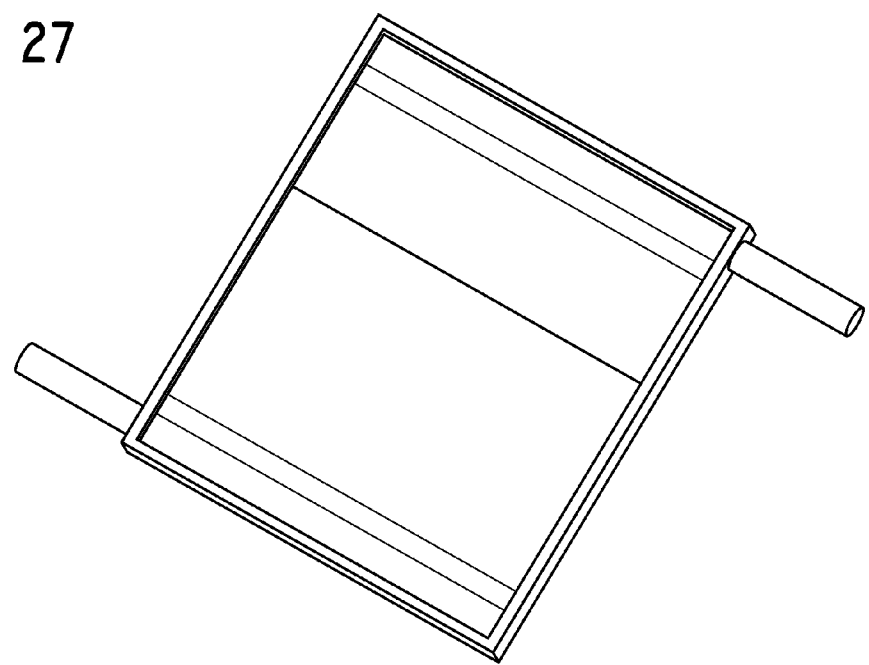
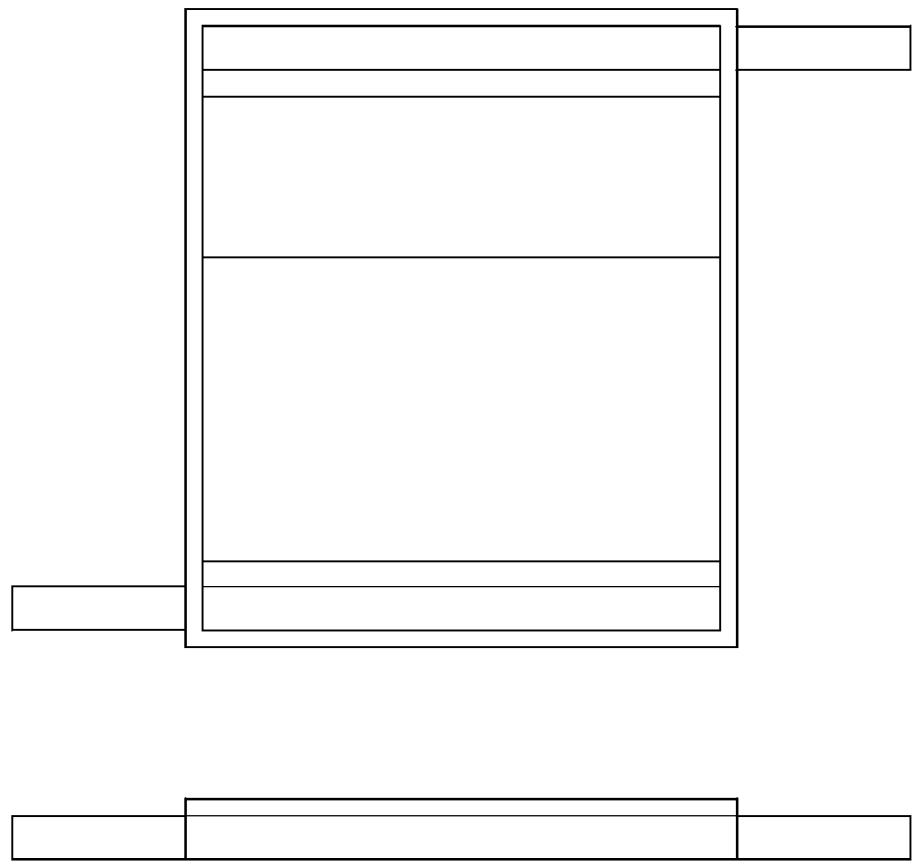

FIG. 28
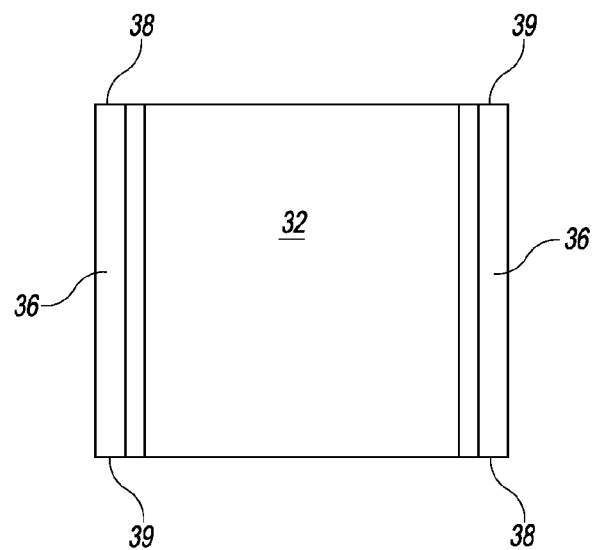
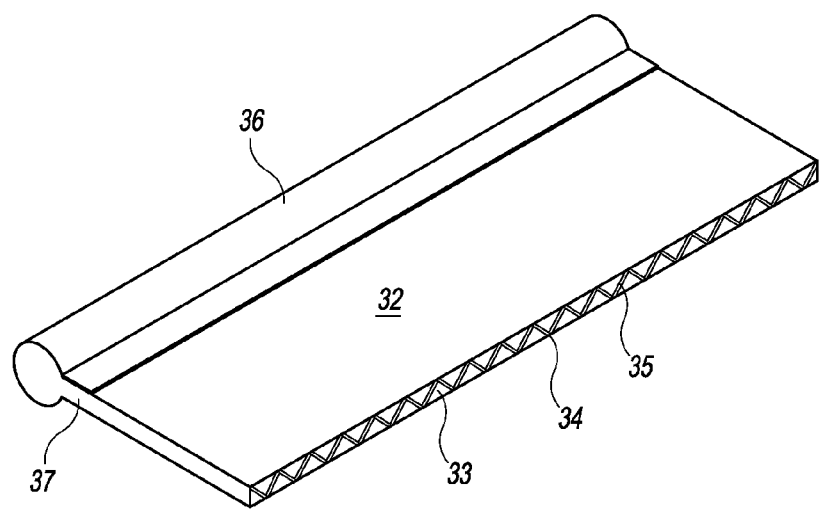
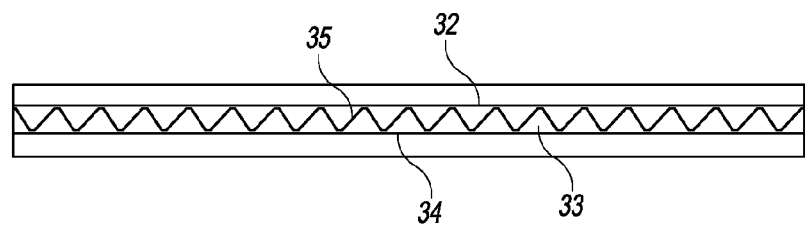

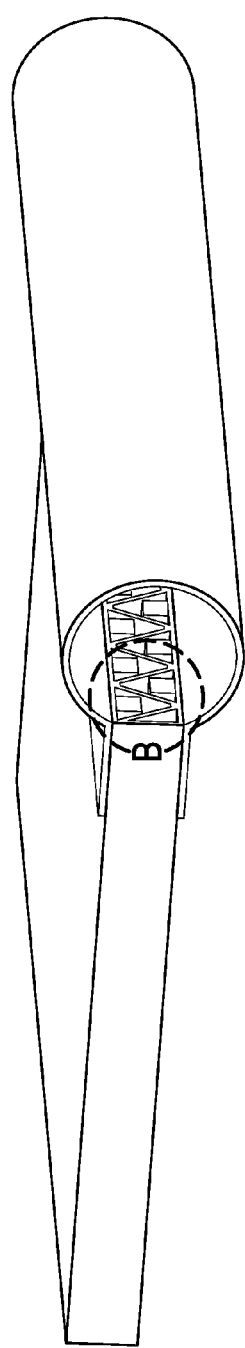
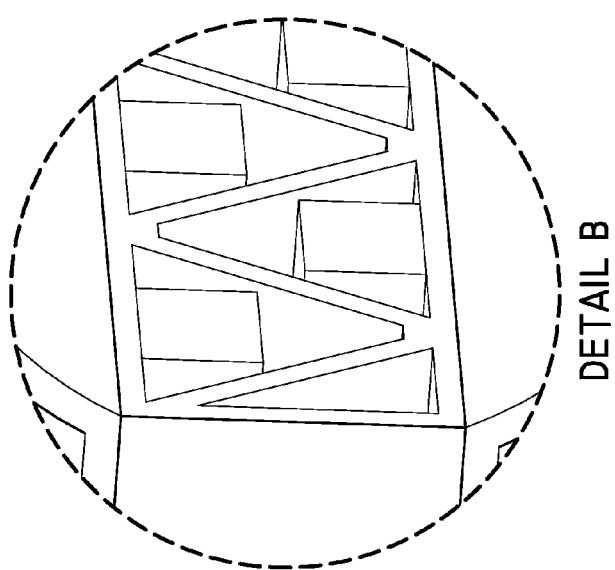
FIG. 30
DETAIL B

TRANSLUCENT PLASTIC SOLAR THERMAL COLLECTOR

CROSS-REFERENCE TO RELATED APPLICATIONS

This application is a national stage application under 35 U.S.C. § 371 of International Application No. PCT/US2014/021601, filed on Mar. 7, 2014, which published in English as WO 2014/164269 A9 on Oct. 9, 2014 and which claims priority benefit of U.S. Provisional Patent Application No. 61/779,274, filed Mar. 13, 2013 the entire contents of all of which are hereby incorporated by reference herein.

BACKGROUND OF THE INVENTION

Field of the Invention

The present invention generally relates to devices used for solar thermal applications or distributed solar thermal applications. In particular, the present invention relates to solar thermal or distributed solar thermal constructions that provide heat and heat-related sources of energy at or near the location where the heat or energy is to be used.

Description of the Related Art

Many attempts have been made to develop a replacement for the flat-plate collector. After what some reported in 2011 was the 100th anniversary of the invention of the flat-plate collector, the collectors have had only modest success in supplying heat for Domestic Hot Water ("DHW"), Space Heating and Cooling and virtually no success for Process Heating and Cooling.

With reference to FIG. 1, the flat-plate collector absorbs energy from the sun on a black surface applied to a copper or nickel metal sheet. The flat-plate solar collector in FIG. 1 is comprised essentially of an inlet connection 1, an outlet connection 2, an absorber plate 3, an enclosure 4, a glazing frame 5, glazing 6, insulation 7, and flow tubes 8. The heat is transferred by conduction to copper tubing containing the fluid medium that is used to heat and cool water. The enclosure that insulates and protects the collector is generally made from a combination of extruded aluminum with a low-iron glass used as a lens. This is the system that converts energy from the sun to usable heat.

Materials of construction of the complete collector have resulted in a product that is very heavy. They required relatively large amounts of energy in their manufacture, resulting in an expensive product. Costs of the materials were also tied to the commodities market with cost increasing as the economy improved. This caused higher prices at just the time people became attracted to the product because they were under pressure as their other costs of living were rising. Production and assembly costs of the flat-plate collectors were also high as were the costs of being in business with a relatively low volume product that also had cyclical sales.

Improvement of the flat-panel collector came haltingly and in Most of the changes in efficiency were minor or cosmetic.

Today, independent organizations that test flat-plate collectors report the BTUs produced per square foot for flat-plate collectors are all in the same range.

From the mid 1970's to the mid 1980's research activity shifted from improving the efficiency and the operation of flat-plate collectors to incorporation of low-cost and light-weight plastics in the design. Early success was achieved in these plastic collectors by using technology partially analogous to those incorporated in flat-plate collectors. An early plastic version (FIG. 2) that is still in use today was made and sold by Sealed Air Corporation. A polypropylene plastic was intimately mixed with black pigment and fabricated into a unitary structure consisting of a black header 9 and a black fluted panel 10 (shown in isometric view). As shown in the cross-sectional end view of FIG. 2, the panel 10 included fluted panel flow channels. The black plastic container absorbed energy from the sun with the energy transferred by conduction to the fluid flowing through the plastic. This is still the primary type of commercial based plastic product that has had a significant degree of success in the market.

The flat-plate collector was effective in providing DHW. The plastic-based product was only acceptable in the far less demanding swimming pool heating market. This is because copper is an extremely good conductor of heat and plastics are used more as thermal insulators, so the transfer of heat from the plastic collector was not efficient.

In numerous attempts to carry plastics technology into the DHW market, inventors focused on replacing polyolefin plastics with polycarbonate, a high transparency colorless plastic. Polycarbonate is so transparent and break-resistant that it is even fabricated into prescription eye glasses. Technology switched in going from the flat-plate and the black polyolefin two-step absorption and conduction process to a one-step absorption in the fluid flowing through the transparent polycarbonate-based system. It was literally sunlight directly to heat.

Polycarbonate was chosen almost across the board in patents for its ability to be used in fabricating high clarity solar thermal collectors (FIG. 3). As shown in FIG. 3, the polycarbonate solar thermal collector includes a header 14 that is bonded with a fluted panel 12 containing the flutes 13. In the entire structure, which is shown in a top view, the fluid enters through the top left side through a fluid plumbing fixture 15, flows through the header that carries the flow through the fluted panel 12 and through the opposing header 14 and out through the plumbing fixture 15 on the bottom right. The end of each header is sealed with a plug 16. The entire structure, except for the plumbing fixtures 15 and 16, is fabricated from polycarbonate. Other advantages quoted for polycarbonate plastics were a relatively reasonable price, high strength and a high glass transition temperature that purportedly allowed collectors to withstand temperatures greater than the boiling point of the water or water/antifreeze mixtures used in DHW collectors. In technology that utilized polycarbonate plastics, the energy was directly transferred to the fluid flowing through the high clarity collector and was directly absorbed by a wide variety of energy absorbing additives dissolved or dispersed in the fluids that were exposed to the sun. Wetting agents, flow patterns and any means that could be considered were quoted as being necessary for an acceptable system.

Polycarbonate plastics were overwhelmingly chosen as the plastic of choice because their light transmission was almost equivalent to that of glass. Plastics with marginally higher light transmissions, such as acrylics and styrene-based plastics, had major obvious shortcomings. They had brittle rather than ductile behavior. Rocks or hail would not bounce harmlessly off a collector mounted on a home and heat distortion temperatures in the range of 180° F. compared to the specified 250° F. for conventional polycarbonate plastics would also not work. Temperatures as high as 200° F.-220° F. were anticipated under normal solar collector operating conditions. Along with the low heat distortion temperature, the cloudy appearance of polypropylene in the non-pigmented state also ruled out polypropylene as an alternate for polycarbonate, as all assumed that the plastic had to be crystal clear to work. Although polycarbonate plastics cost more than the aforementioned high volume plastics, the price premium was considered acceptable because of the properties apparently inherent from the use of polycarbonate materials. The choice was apparent.

Unfortunately, overlooked was that the polycarbonate had a fault that was not acknowledged in the literature of the manufacturers: there was an instability built into the molecular structure of the polycarbonate resin that, when it was fabricated into a collector, the collector would fail at temperatures similar to those used in swimming pool heating applications. Clearly, such configurations would fail at the far higher temperatures required for DHW and Space Heating. Actual properties limited use to approximately 120° F. in most applications because the plastic rapidly degraded and leaks would develop in the collector during use at higher temperatures.

SUMMARY OF THE INVENTION

None of the inventions that were patented in the U.S. based on the high clarity, high strength plastic polycarbonate ever had commercial success. The structural defect manifested itself in failure of collectors fabricated from polycarbonate plastics at anywhere near the temperatures required for DHW applications. The failure was in the form of pinhole leaks that were difficult to find initially but grew during further use in service.

Upon investigation, the problem appears to have been caused by hydrolysis when water-based or water/glycol based fluids were used within the system. With oil-based fluids the oil also reduced the operating efficiency of the system. This rendered the product useless in producing hot water in conventional operating environments. Accordingly, there has been a long felt need for a lightweight panel capable of operating in a solar thermal collector with liquid temperatures that consistently exceed 180° F.

Prior to our invention, solar thermal, as provided by the flat-plate collector, has been the most cost effective means of using the sun to provide energy. We have invented a lower cost, more efficient way of producing energy from the sun that can now be utilized to provide more Domestic Hot Water, Space Heating and Space Cooling at a lower cost than has been provided before. Certain features, aspects and advantages of the invention make the system cost-effective enough to be utilized for the high volume Industrial energy products, e.g. Process Heating and Process Cooling, and cost-effective enough for other applications without government subsidies.

Certain features, aspects and advantages of the present invention directly utilize the sun's rays to heat a liquid. The heat is captured in both the materials of construction of the collector and the fluid contained in the collector. The system overcomes the deficiencies of a flat-plate based system noted above. The collector itself utilizes three dimensions in a one-step process to absorb heat directly from the sun. The collector incorporates durable, lightweight and low-cost materials in its production. The manufacturing process is far less costly than that used to make traditional flat-plate solar collectors. The collector is lighter and easier to install than the cumbersome flat-plate collector, and at long last, the collector results in a plastic product that can be trusted.

Certain features, aspects and advantages of the present invention utilize the material that is used to build the structure of the collector to directly convert the energy of the sun to heat. The conversion occurs through the use of plastics with low light transmission rather than the broadly sought high light transmission products. At the same time, the fluid contained within the device also converts the sun's energy to heat directly by absorption in addition to conduction from the collector. This combination results in a higher efficiency in the conversion of the energy of the sun to usable heat. The materials of construction cost less and are less energy intensive to produce. There is essentially no fluctuation in terms of price due the idiosyncrasies of the commodities market.

Also, as one class of our embodiments, we utilize a completely different class of materials from that normally thought of as plastics, e.g. polycarbonate, polypropylene, acrylics, polystyrene, et al. We utilize the thermosetting resin based material, Fiberglass Reinforced Plastics ("FRP"). FRP, rather than competing with plastics in the market, competes with metal, with the most conspicuous example being the Boeing Dreamliner plane. In accordance with certain features, aspects and advantages of the present invention relate to the use of translucent FRP products, which, to our knowledge, have never been used to produce solar thermal collectors.

In some embodiments, a solar thermal system comprises a solar thermal collector having a translucent fiberglass reinforced plastics (FRP) panel. The system can also comprise a pump, a valve, a storage tank, a boiler, and a controller. Fluid connectors can be in communication with the solar thermal collector, the pump, the valve, the storage tank, and the boiler. Fluid flow within the system is controlled by the controller. In some embodiments, the translucent FRP panel comprises high-strength, high-temperature resin. In some embodiments, the translucent FRP panel comprises about 30% glass content. In some embodiments, the translucent FRP panel comprises a dye.

In some embodiments, a method for heating fluid comprises providing a solar thermal system comprising a solar thermal collector having a translucent fiberglass reinforced plastics (FRP) panel, a pump, a valve, a storage tank, a boiler, a controller, and fluid connectors in communication with the solar thermal collector, the pump, the valve, the storage tank, and the boiler. Fluid flow within the system is controlled by the controller. Fluid is circulated through the solar thermal system. In some embodiments, the fluid comprises a dye. In some embodiments, the fluid flow comprises a pulsing flow. In some embodiments, the fluid flow comprises a turbulent flow.

In some embodiments, a solar thermal collector system comprises an inlet header, a outlet header, and a translucent panel coupled with the inlet header and the outlet header. The panel comprises a first layer, a second layer, and a third layer positioned between the first and second layer. The third layer is an undulating layer. In some embodiments, the panel comprises a FRP material. In some embodiments, the panel comprises a thermoplastic material. In some embodiments, the undulating layer comprises a sinusoidal shape. In some embodiments, the undulating layer comprises a trapezoidal shape. In some embodiments, the undulating layer comprises a triangular shape. In some embodiments, the undulating layer comprises a rectangular shape. In some embodiments, the undulating layer comprises a dye.

In some embodiments, a solar thermal collector system comprises an inlet header, a outlet header, and a translucent panel coupled with the inlet header and the outlet header. The panel comprises a first layer and a second layer. The first and second layers comprise a fiberglass reinforced plastics (FRP) material. In some embodiments, the panel comprises a third layer. In some embodiments, the panel comprises at least seven layers.

In some embodiments, a solar thermal collector system comprises an inlet header, a outlet header, and a translucent panel coupled with the inlet header and the outlet header. The panel comprises a first layer and a second layer. The first and second layers comprise a thermoplastic material. In some embodiments, the panel comprises a third layer. In some embodiments, the panel comprises at least seven layers.

In some embodiments, a method for manufacturing a portion of a solar thermal collector system comprises providing a first layer of translucent fiberglass reinforced plastics (FPR) material, a second layer of translucent FRP material, and a third layer of translucent FRP material. The third layer is an undulating layer and is positioned between the first and second layer. The first, second and third layers are bonded by coupling the layers together under pressure during the curing of a resin forming the FRP material, thereby forming a translucent panel. In some embodiments, the panel is coupled with a header.

In some embodiments, a method for manufacturing a portion of a solar thermal collector system comprises coextruding first, second and third layers of a thermoplastic material forming a panel wherein the third layer is an undulating layer and is positioned between the first and second layer, thereby forming a translucent panel. A UV stabilizer film is laminated on at least one of the first and second layers. In some embodiments, the panel is coupled with a header. In some embodiments, the thermoplastic material comprises polysulfone resin.

Certain features, aspects and advantages of the present invention utilize low cost and durable materials that are readily available in the U.S. The materials that may be used in making the product include the broad classes of FRP and thermoplastics. There are further economies from the process used in making our products. As such, the product can be placed in production more rapidly and increases in production can occur seamlessly.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures:

FIG. 7 is an isometric view of another embodiment of a collector that uses a layer of FRP to absorb the energy from the sun and convert it to heat, as well as utilizing a darkened surface to collect additional heat produced in the structure, with fluid circulating through the preferred embodiment to further convert energy from the sun to heat.

FIG. 8 is an isometric view of a further embodiment of a collector that uses thermoplastic materials designed to directly correct the problems previously manifested in the polycarbonate solar collector shown in FIG. 3.

FIG. 9 is a top and side view of an oval-shaped solar thermal collector. FIG. 10 is a top and side view of a trapezoidal-shaped solar thermal collector. FIG. 11 is a top and end view of a sinusoidal solar thermal collector.

FIGS. 12-31 are representations of alternative embodiments of collector systems, including various embodiments of panel system configurations and header components.

DETAILED DESCRIPTION OF THE PREFERRED EMBODIMENT

Certain features, aspects and advantages of the present invention relate to a highly durable, cost-effective version of a solar collector product featuring low-light transmission. In some configurations, the solar collector utilizes a translucent FRP as the material of construction. The solar collector can be based on a high-strength, high-temperature resin that may include about 30% glass content. The collector can feature low-light transmission and can be based on a system that absorbs energy from the sun and converts it to large amounts of heat. The low-light transmission of the material in the collector arises from the color of the resin, the glass loading, and/or the addition of a dye to achieve the final desired effect. Dye can be added when desired in an otherwise moderately clear product or to overcome an otherwise undesired visual effect, e.g., as may be desired in the product when an even higher glass fiber content is used to strengthen the base material.

Low light transmission into the solar fluid of a collector, similar to the many manifestations of the polycarbonate collector, has been rejected by the other inventors in the solar thermal collector field. It is believed that low light transmission, however, can make a significant difference in the successful design and manufacture of a solar thermal collector designed to replace flat-plate collectors.

Figure 1:
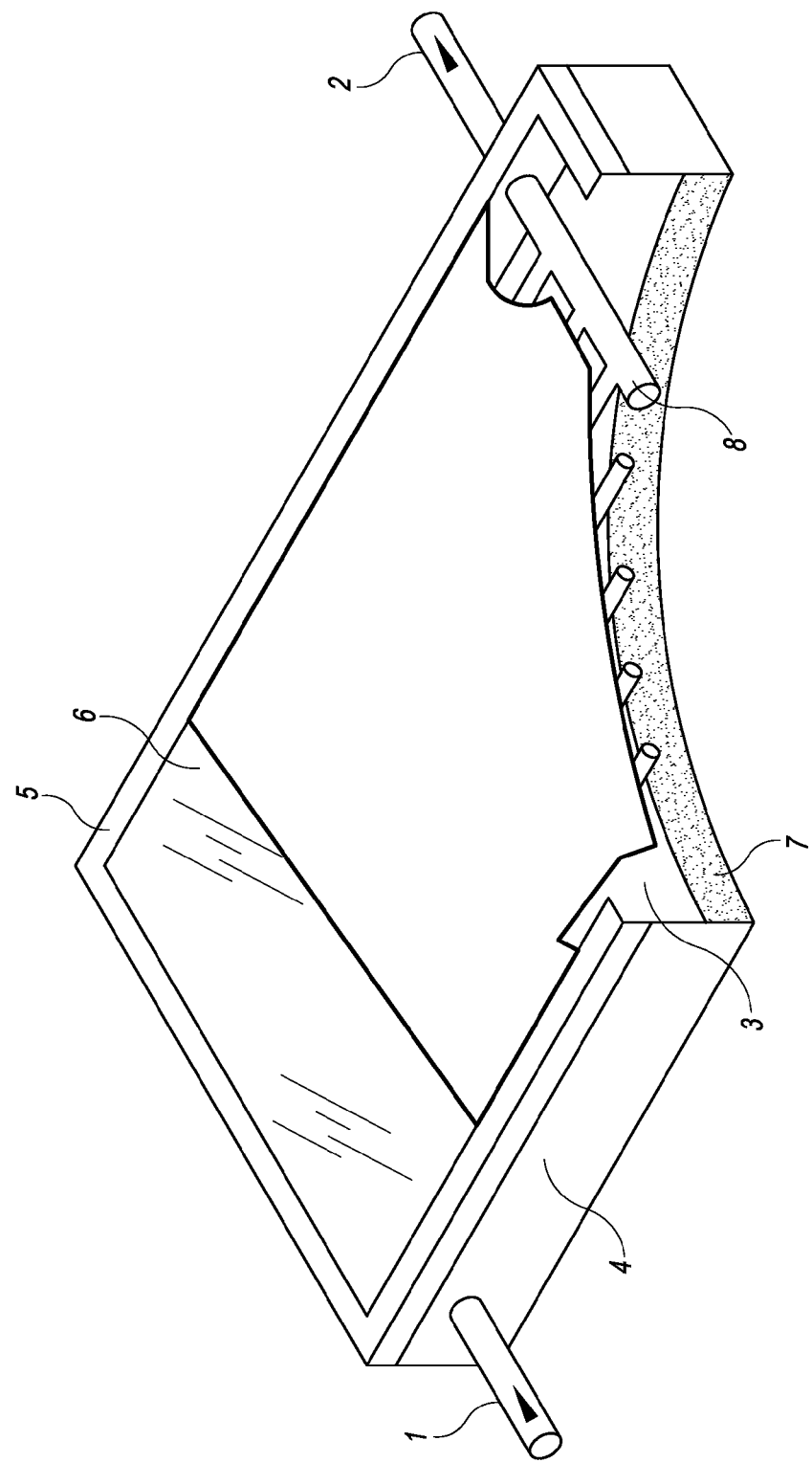
FIG. 1 is a view of a conventional flat-plate solar collector that is partially cut away to expose interior construction details, which collector is being presented as representative of the class of products our preferred embodiment is designed to replace.
Figure 2:
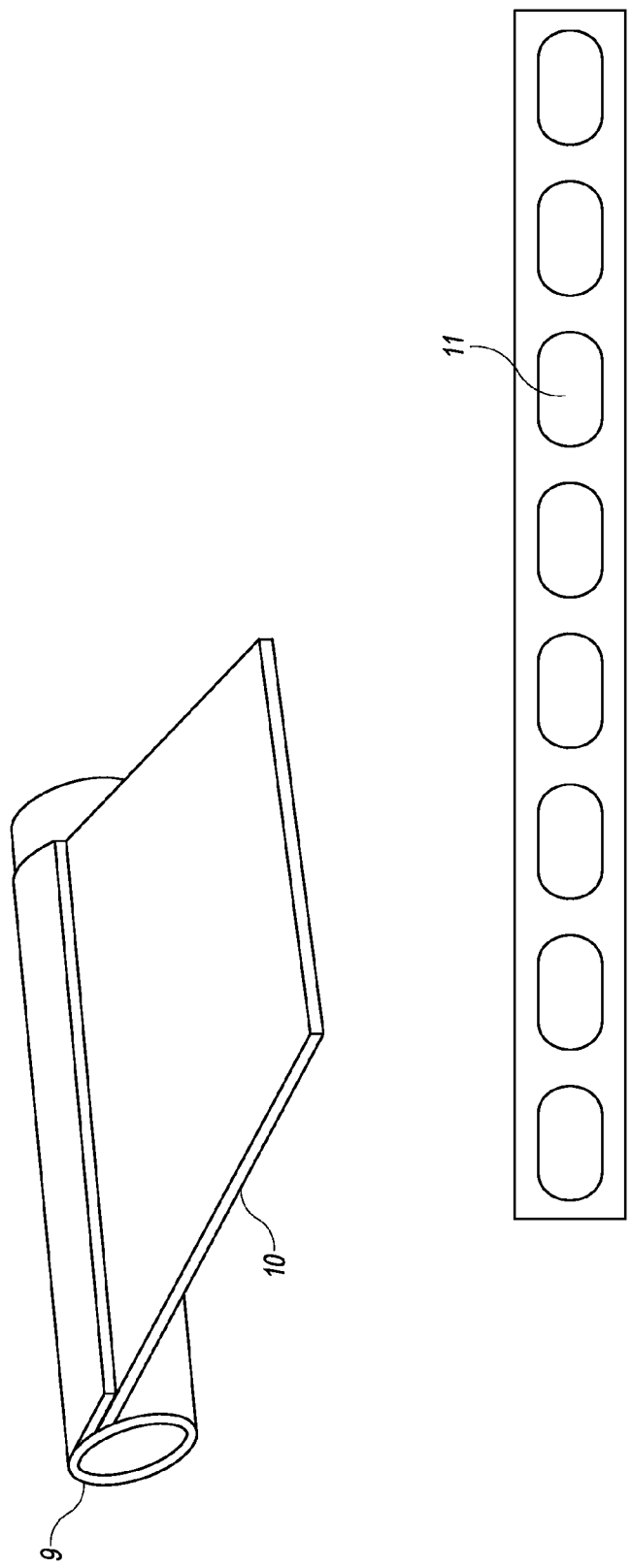
FIG. 2 is a plastic version of a conventional flat-plate collector that is presented to show the early plastic analog of the flat-plate collector shown in FIG. 1.
Figure 3:
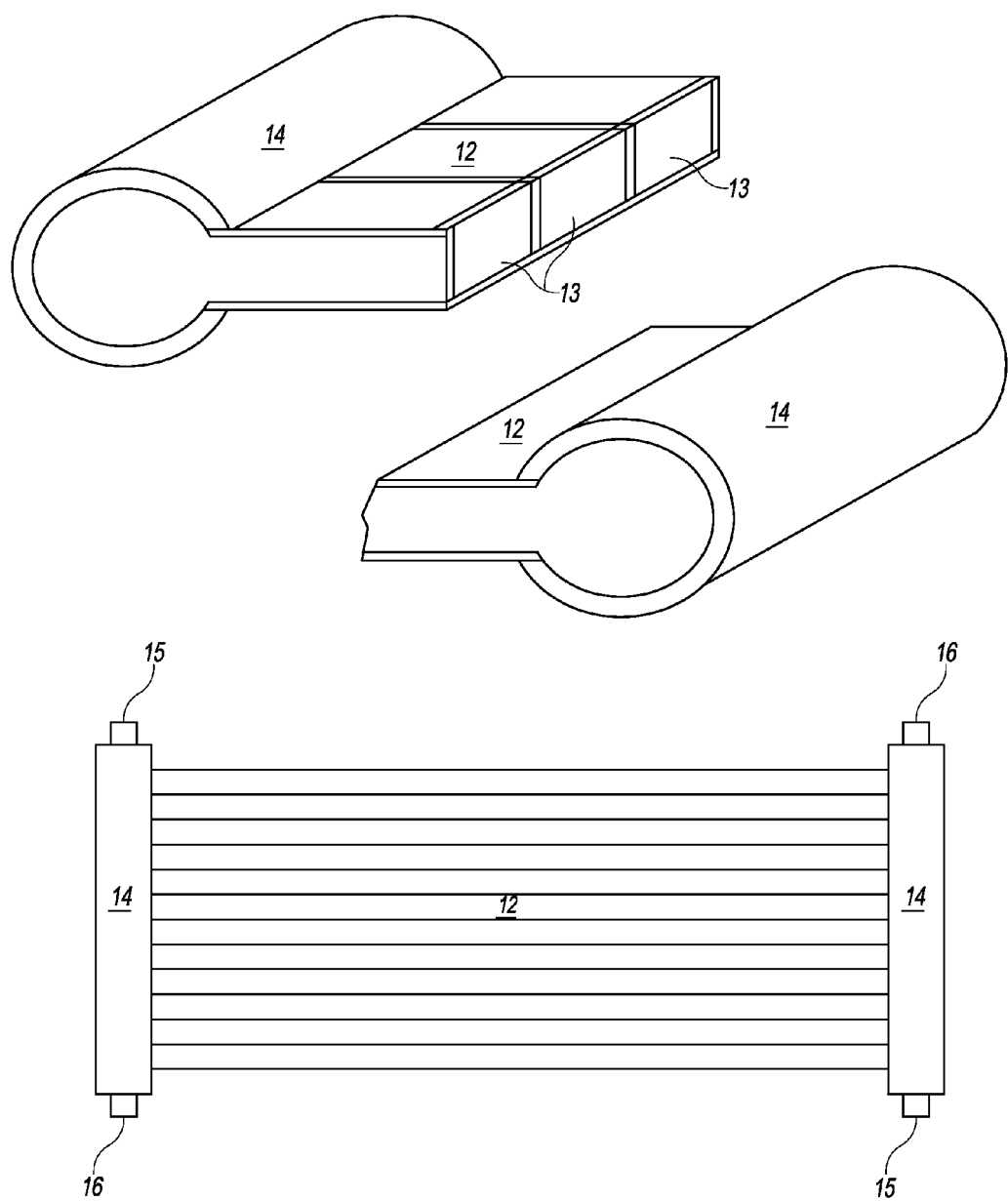
FIG. 3 is a top view and a cut away isometric side view of a polycarbonate solar thermal collector that contributed markedly to the problems in trying to replace flat-plate solar collectors with plastic collectors.
Figure 4:
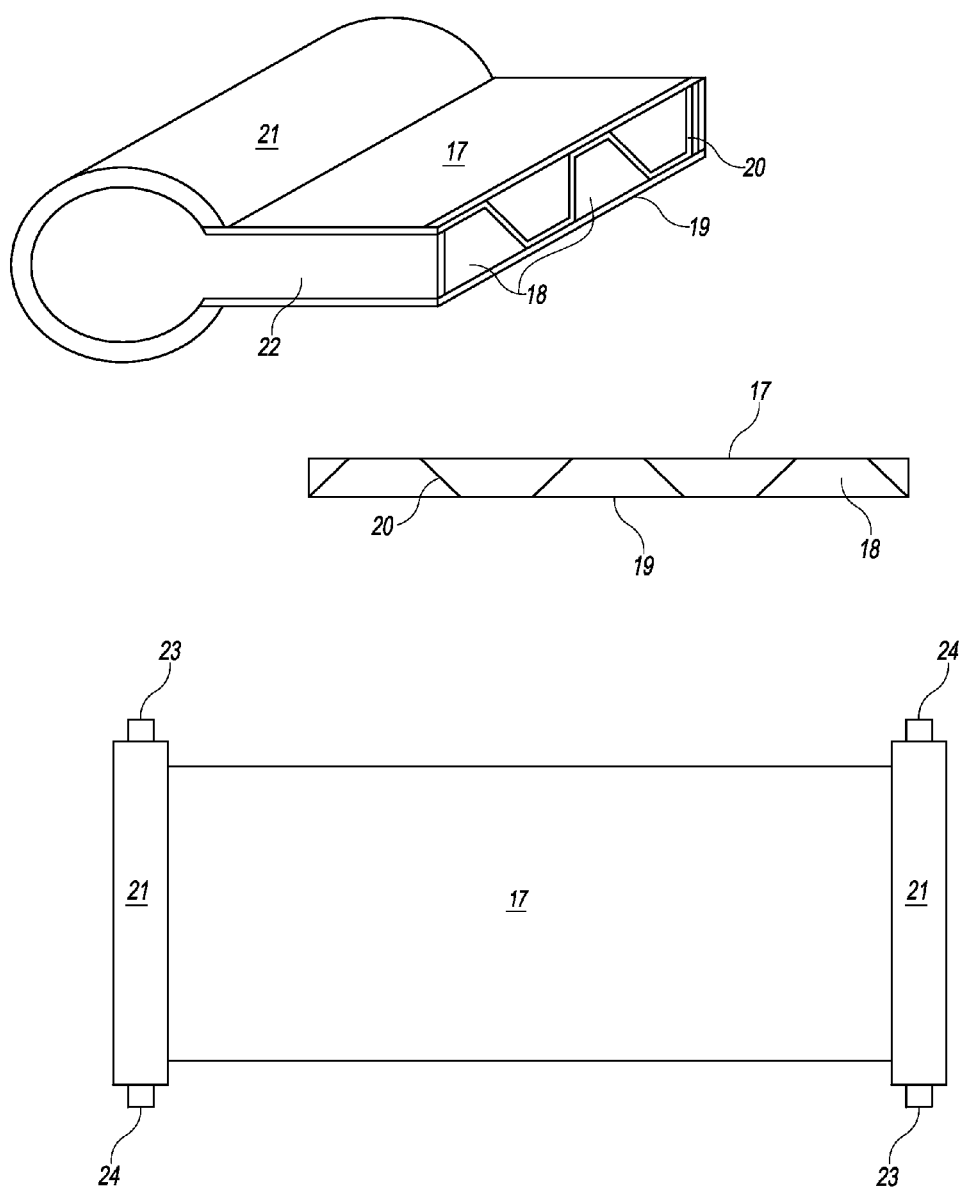
FIG. 4 is an illustration of an embodiment of a collector that is arranged and configured in accordance with certain features, aspects and advantages of the present invention, the collector being made of Fiberglass Reinforced Plastic ("FRP") and being based on two layers of FRP that are used to absorb the energy from the sun and convert it to heat, as well as utilizing a darkened surface to collect additional heat produced in the structure. The collector also uses fluid circulating through the collector to further convert energy from the sun to heat.

FIG. 4 illustrates an embodiment of collector that is arranged and configured in accordance with certain features, aspects and advantages of the present invention. The illustrated collector incorporates three surfaces to collect and absorb heat. The top surface of the collector 17 can be separated from the bottom surface of the collector 19 by an undulating structure 20 that separates the top layer from the bottom layer and that provides the portion of the collector that contains the fluid and through which the fluid is pumped 18 from the inlet to the outlet. In the top view the header 21 is attached to the fluted panel 22. Fluid enters the header through the plumbing fitting 23 in the top left hand corner of the top view, travels through the header on the left side 21 through the fluted panel 22, enters the header 21 on the right side of the top view, and exits through the plumbing fitting 23 on the lower right hand corner of the top view. The system is sealed with plugs 24.

While a two surface FRP collector is superior in efficiency of producing heat from the sun relative to flat-plate collectors, the three surface collector, such as that shown in FIG. 4, consistently outperformed that of our two surface product.

The top surface of the collector has low light transmission from the base material's natural color, combined with incorporating a dark, yet soluble, dye additive. The intermediate undulating structure is translucent. This results from the base material's natural color combined with incorporating a dark, yet soluble, dye in which the energy from the sun is converted to heat as it passes through the collector. In some configurations, a soluble dye can be incorporated into the fluid to provide another source of heat production. The bottom surface of the collector is either left translucent from the base material's natural color with a dark or black absorbing or reflecting surface in close proximity to the bottom surface of the container, or is darkened or made black through addition of a pigment or dye. Heat can be absorbed and stored or reflected back into the fluid to add to the conversion to heat in the colored fluid.

In some embodiments, the system can include an intermittent on-off flow variable speed circulating pump to move the fluid through the collector and the associated solar controller to control the operation. The design of the undulating structure combined with the pulsing flow exposes new surfaces to the sun. This significantly increases heat transfer in the $3/8$" deep solar fluid as it traverses the 8 foot long channel.

Figure 5:
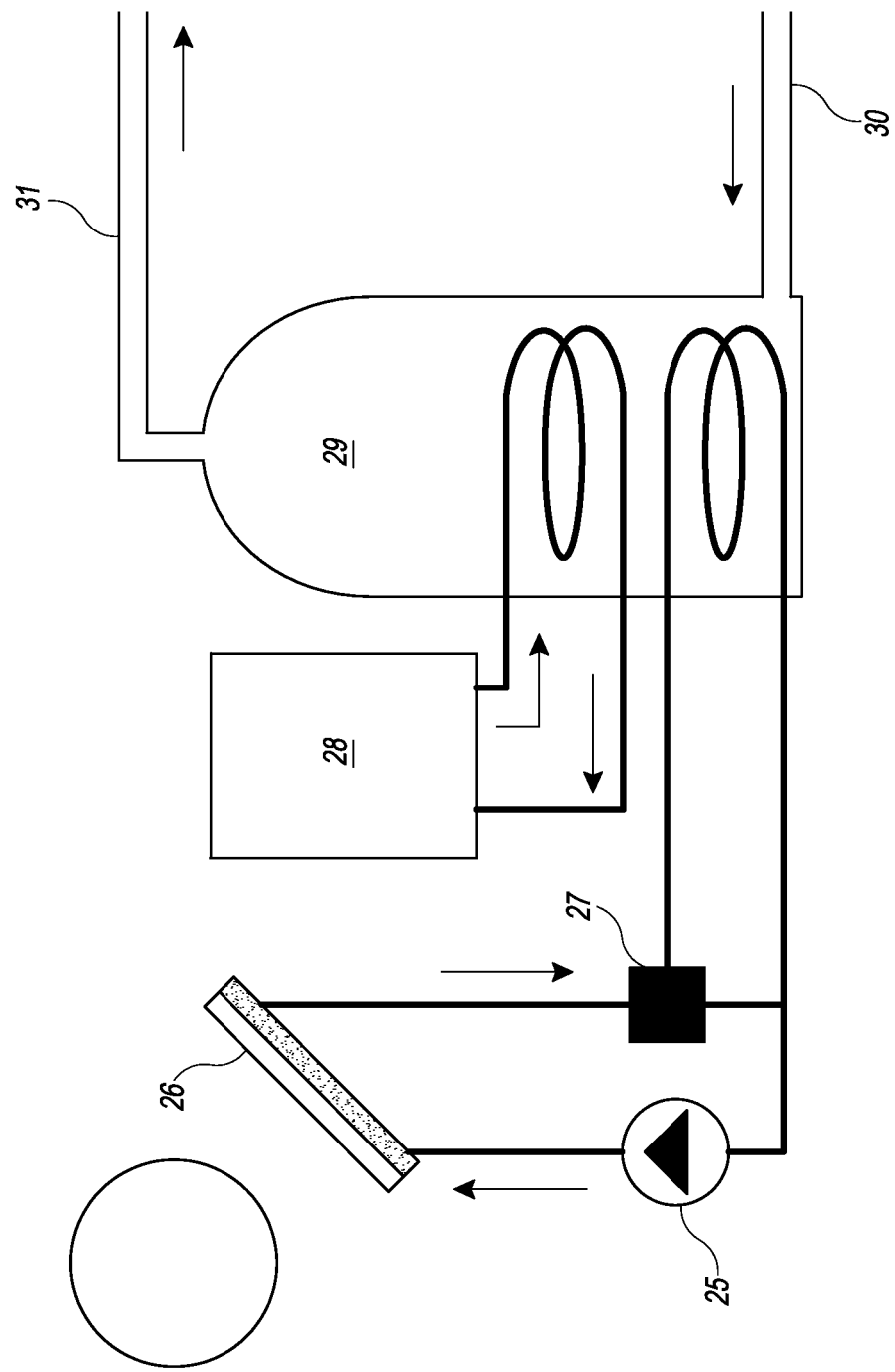
FIG. 5 is a drawing of a solar thermal collector operating system that includes the solar collector of FIG. 4.

FIG. 5 is a representational drawing of a solar thermal system that can use the collectors described herein. The pump and controller 25 can be used to re-circulate solar fluid through the solar thermal collector 26 with flow through the controller to the pump and a diverter valve 27 directing heated water through the solar twin coil storage tank. The boiler 28, the solar twin coil storage tank 29, the cold water 30, and hot water 31 are included to provide information on the rest of the solar thermal collector system.

Figure 6:
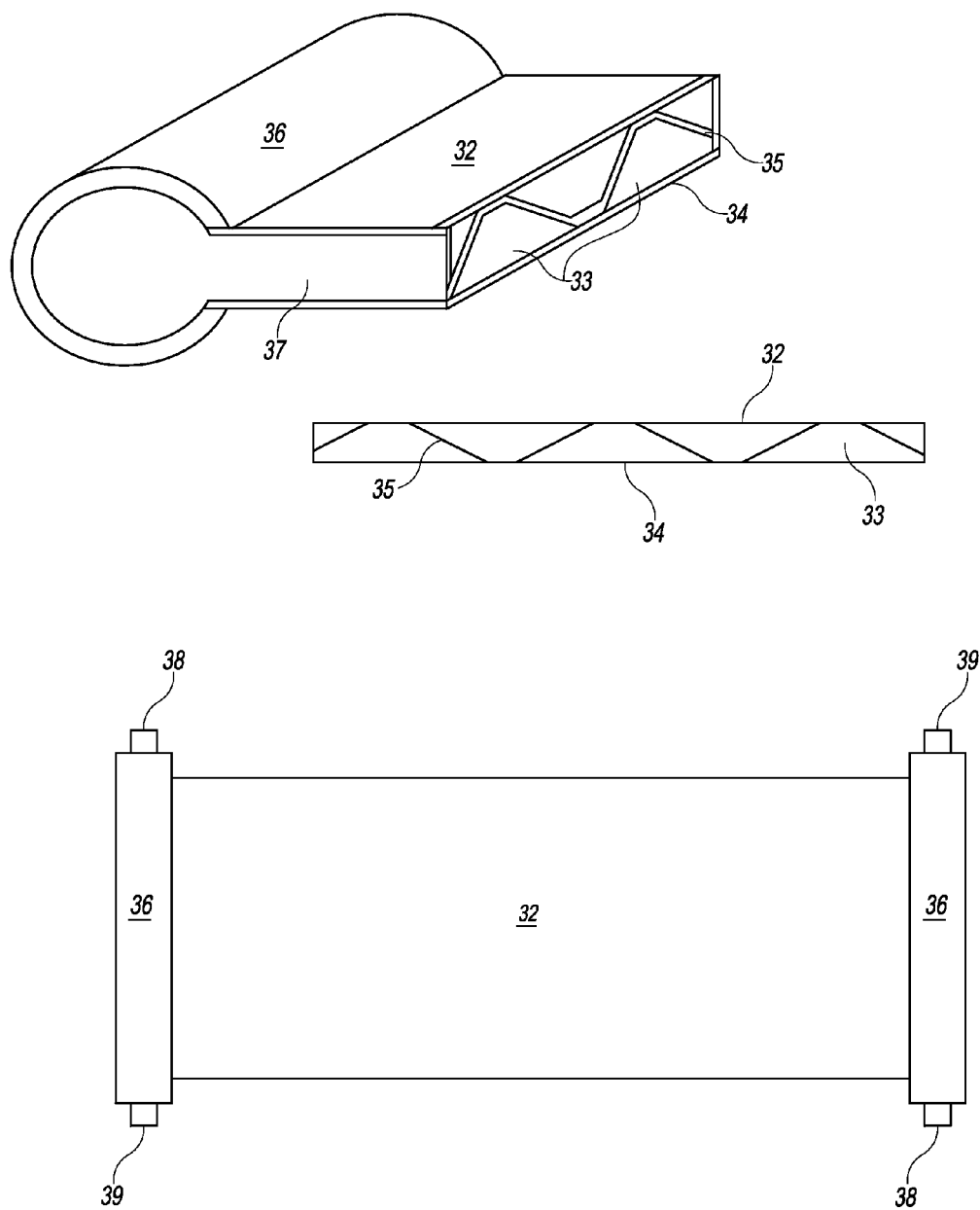
FIG. 6 is an isometric view of another embodiment that is arranged and configured in accordance with certain features, aspects and advantages of the present invention.

In some embodiments (e.g., as shown in FIG. 6), a translucent FRP is used as the material of construction. The translucent FRP is based on a high-strength, high-temperature resin with increased glass content (see below for details). The translucence of the material arises from the color of the resin, the glass loading, and/or adding a dye to achieve the final desired effect.

In some embodiments, the top surface of the collector that is separated from the bottom surface is altered with a new profile of the undulating structure that separates the top layer from the bottom layer. FIG. 6 is an illustration of this embodiment of our collector. The illustrated collector incorporates three surfaces to collect and absorb heat. The top surface of the collector 32 can separated from the bottom surface of the collector 34 by an undulating structure 35 that separates the top layer from the bottom layer and that provides the portion of the collector that contains the fluid and through which the fluid is pumped from the inlet to the outlet. In the top view, the header 35 can be attached to the fluted panel 37. Fluid enters the header through the plumbing fitting 38 in the top left hand corner of the top view, travels through the header on the left side 36 through the fluted panel 37, enters the header 36 on the right side of the top view, and exits through the plumbing fitting 38 on the lower right hand corner of the top view. The system can be sealed with plugs 39.

The illustrated configuration modifies the portion of the collector that contains the fluid through which the fluid is pumped from the inlet to the outlet. The width can be reduced of both the bottom and top surface that is attached to each flat surface of the undulating structure. In some configurations, the ratio of attached to unattached across the width of the top or bottom surface is about $1/3$. In some configurations, the ratio is about $1/4$. In some configurations, the ratio is less than about $1/2$. This occurs for the length of flow in the collector.

The embodiment illustrated in FIG. 6 results in a greater portion of the fluid that is separately exposed to both the top surface and the undulating surface, increasing the ability to capture heat. This increases the efficiency of the collector compared to the embodiments described above. Further, the flow pattern combined with the pulsing fluid results in the availability of cooler fluids to which the energy from the sun is transferred as the fluid progresses from the entry point until it leaves the collector. This also increases the efficiency of the collector compared to the embodiments described above. In addition, in some embodiments, the glass content of the undulating layer can be increased to 40% to increase the strength of the undulating layer. In some such embodiments, the dye content can be adjusted (e.g., decreased) marginally to restore the light transmission to its level prior to the increase in glass content.

As can be seen in FIG. 4 and FIG. 6, the design of the three surface solar collector facilitates manufacture of the collector. The top surface and the bottom surface can be attached to the undulating surface under pressure and bonded during the curing of the resin. Is such embodiments, no adhesive is used in the manufacture of the collector. Moreover, because of the use of FRP in manufacturing the three surface solar collector, and because of the desire for a fairly complete cross-section, manufacturing the panel through extrusion or pultrusion is difficult. As such, forming the top surface, bottom surface and undulating surface and attaching them through pressure and bonding during curing is desired.

With reference to FIG. 7, another embodiment of the solar collector utilizes a translucent FRP as the material of construction. The solar collector uses a high-strength, high-temperature resin with about 30% glass content. The low-light transmission of the material in the collector arises from the color of the resin, the glass loading, and/or adding a dye to achieve the final desired effect. Dye also can be added when desired in an otherwise moderately clear product or to overcome an otherwise undesirable visual effect, e.g. that is required in the product when an even higher glass fiber content is used to strengthen the base material.

With reference to FIG. 7, the illustrated solar collector is a two surface collector as opposed to the three surface collectors described above. The header 42 can be bonded to the fluted panel 40 containing the flutes 41. In the illustrated structure, which is shown in a top view, the fluid enters through the plumbing fitting 43 in the top left, then to the header 42, and through the fluted panel 40, and then through the header 42 and then goes out through the plumbing fixture 43 on the bottom right. The end of each header can be sealed with plugs 44. The top surface of the collector can have low-light transmission from the base material's natural color combined with incorporating a dark, yet soluble, dye additive. There is no structure that separates the top layer from the bottom layer. The separation is achieved from vertical webs spaced a nominal ¾" apart, for example but without limitation. This structure has a higher strength that facilitates its operation in municipal water environments. In some embodiments, a soluble dye can be incorporated into the fluid. The bottom surface of the collector can be left translucent from the base material's natural color and the dye that was incorporated into making the entire fluted panel of the collector. In some configurations, there is a black absorbing surface in close proximity to the bottom surface of the container.

In some embodiments, a high-strength resin without glass can be used to form the panel of the collector. In some configurations, the material may have a Heat Distortion Temperature of about 203° F. (95° C.). In some configurations, the light transmission can be in the range that will allow the addition of dye to achieve a desired level of translucence. The low light transmission is in the form of a haze, which may result from a difference in refractive index between a blend of a conventional FRP resin and a thermoplastic. The panel formed of this material can be a two surface design; in some configurations, the panel can be structurally similar to or identical to the embodiment shown in FIG. 7.

In some embodiments, materials having high durability and chemical resistance that typifies conventional glass reinforced FRP can be used. In some configurations, the materials can be used for lower temperature versions of collectors in combination with appropriate temperature controls in the solar thermal collector system.

By modifying the fluid through addition of more or less dye, the amount of heat produced during different times of the year can be fine tuned. For example, the same collector device can be used in different parts of the world simply by making the fluid coloring lighter or darker. In some embodiments, the heat produced can be magnified by combining heat produced in the walls of the structure with heat from the fluid.

The use of FRP provides advantages when compared to plastics, such as polyolefins and the polycarbonates that were evaluated as an alternative to the flat-plate. FRP is very durable in a wide range of applications, has a longer life (25 year guarantees have been given in outdoor applications for even the more mundane classes of products), resists high temperatures, and resists attack by virtually all fluids. The use of the FRP as a collector also provides an advantage in its being lightweight compared to the metal flat-plate collectors. The collector is more readily installed on the sloping roof of a home. Shipping costs from factory to location are lower. Manpower to install is lower.

Another advantage of FRP is that it can be processed into a wide variety of designs in a very economical method based upon the cost of dies and tooling to manufacture the product. As volume increases, higher-speed methods of fabrication moving from a vacuum-assisted resin infusion molding to a combination of pultrusion, filament winding and final assembly can be used.

Although not normally considered by people working with a wide variety of materials of construction, water is a very aggressive solvent and hot water is even more aggressive. In some embodiments, the solar collector employs an economical thermoplastic that can handle hot water. History has shown that, after years of unpleasant experiences with polycarbonate, these materials, although they can result in a higher volume of sales because of the economics of their production, may have a lower durability.

In thermoplastic-based embodiments, thermoplastics can be used that have a haze and a lower-light transmission than that was considered essential in collectors based on polycarbonate. The perceived disadvantage of haze has been discovered to be an advantage and can be found in embodiments of the collector formed from polysulfone resin. The polysulfone resin collectors have an amber color that is highly efficient in converting the sun's energy to heat. In addition, polysulfone degrades because of a marginal resistance to ultra-violet ("UV"). Rather than being a markedly negative property of the polysulfone, the primary effect of this degradation in solar collectors is to cause the product to darken into a bronze color that is even more efficient in converting the sun's energy to heat. Thus, the perceived problem of degradation can be beneficial so long as the degree of degradation is controlled.

To keep the degradation under control, a film containing a UV stabilizer has been laminated to the side of the collector that is facing the sun. The film can act to protect the polysulfone for its normal product life. In some embodiments, a soluble dye can be incorporated into the fluid to provide another source of heat production.

In some configurations, the thermoplastic collector could have been made with the same structure as that described above for the FRP. However, the manufacturing process best used for such embodiments is thermoplastic co-extrusion and final assembly.

In some embodiments, the panel is formed as a double layer of flutes. A double layer of flutes is a variation of the three surfaces in the FRP collector embodiments described above. FIG. 8 is illustrates a thermoplastic based collector embodiments. FIG. 8 shows a top view and a cut away isometric side view of an embodiment of the polysulfone collector. The header 47 can be bonded to the fluted panel 45 containing the flutes 46. In the illustrated structure, which is shown in a top view, the fluid enters through the plumbing fitting 48 in the top left, then to the header 47 and through the fluted panel 45, and then through the header 47 and then goes out through the plumbing fixture on the bottom right 48. The end of each header can be sealed with plugs 49.

In some embodiments, the flutes can be contained in a multi-layer product with up to about 7 layers. Using up to seven layers allows the product to be used as an insulated mono-structure without an enclosure. Thus, such a configuration greatly simplifies and lightens the solar collector.

In some configurations, as an alternative to polysulfone, even darker amber polyetherimide can be used as a base material. Polyetherimide has better properties but is also more expensive. In some configurations, polysulfone and polyetherimide in intimate blends with polyethylene terephthalate ("PET") or styrene maleic anhydride ("SMA") can be used to reduce raw material costs, improve processability, and modify the balance of properties to better meet the needs of the solar thermal collector market. These blends have the characteristics of interpenetrating polymer networks that also maintains the degree of translucence of the partially incompatible plastics.

In some embodiments, a collector device is made from a translucent or transparent material that can be converted to a low light transmission material by the addition of dyes or other materials that absorb energy from the sun. The device can be totally enclosed other than having a structure for fluid entering and leaving the device and a structure for advancing the fluids through the device, such as the pump shown in FIG. 5

Figure 9:
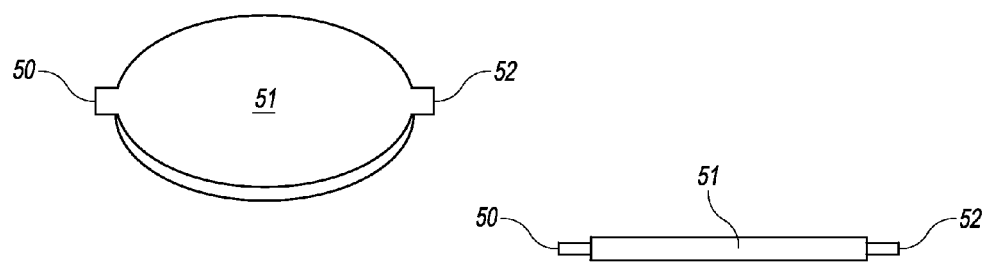
FIGS. 9, 10, and 11 are representations of three of many possible designs that can be made from any of the materials described below.
Figure 10:
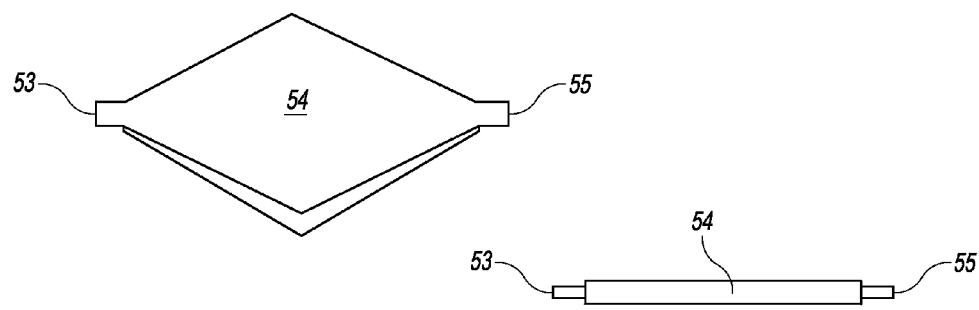
Figure 11:
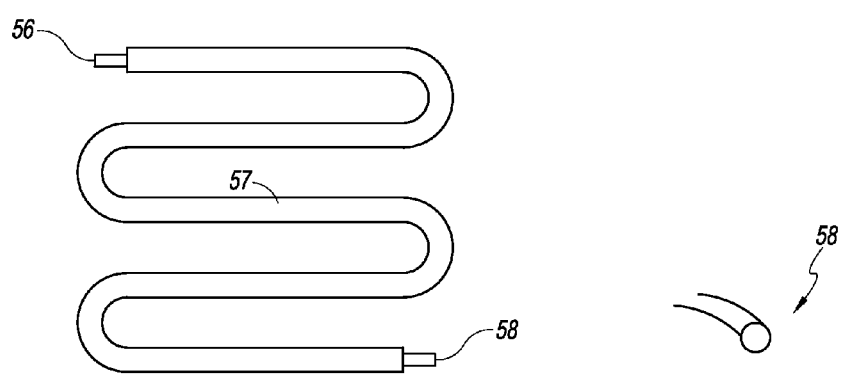

FIGS. 9, 10, and 11 are illustrations of three of many designs that could be used as an embodiment to convert energy from the sun into usable heat through a translucent surface that is oriented to face the sun or to face a reflection from the sun that is based upon any of the embodiments described above. FIG. 9 is an oval-shaped collector with the plumbing fitting 50, the collector device 51, and plumbing fitting 52. The fluid enters through the plumbing fitting 50, flows through the collector 51, and exits through the plumbing fitting 52. FIG. 10 is a trapezoidal-shaped collector with the plumbing fitting 53, the collector device 54, and the plumbing fitting 55. The fluid enters through the plumbing fitting 53, flows through the collector 54, and exits through the plumbing fitting 55. FIG. 11 is a sinusoidal-shaped collector with the plumbing fitting 56, the collector device 57, and the plumbing fitting 58. The fluid enters through the plumbing fitting 56, flows through the collector 57, and exits through the plumbing fitting 58.

Additional Collector System Embodiments

Figure 12:
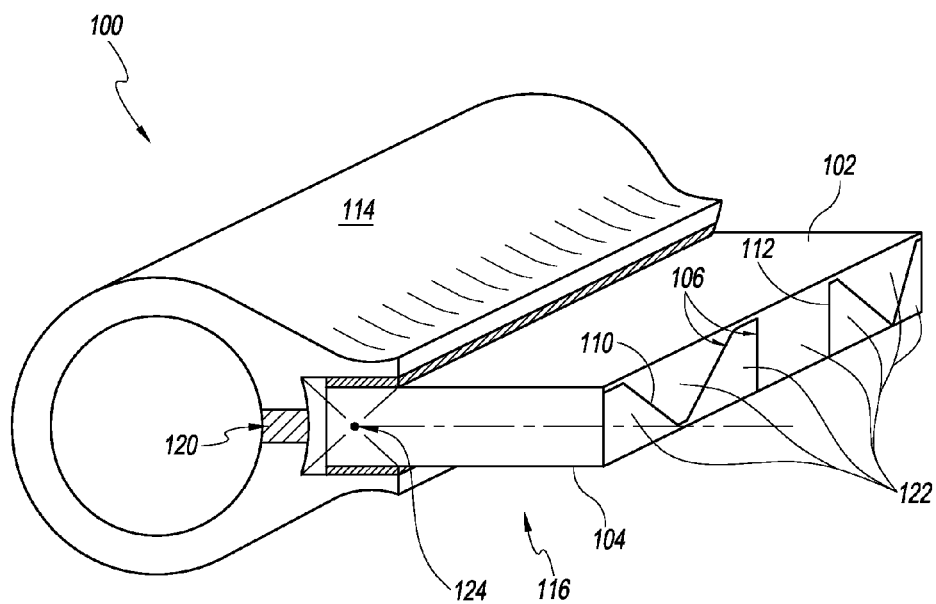

FIG. 12 illustrates an embodiment of collector that is arranged and configured in accordance with certain features, aspects and advantages of the present invention. The illustrated collector 100 incorporates a plurality of surfaces to collect and absorb heat. The top surface 102 of the collector can be separated from the bottom surface 104 of the collector by one or more structures 106 that separate the top layer from the bottom layer and that provide the portion of the collector that contains the fluid and through which the fluid is pumped from the inlet to the outlet. In some embodiments, the top surface of the collector is separated from the bottom surface with a plurality of profiles of undulating structures 110 that separates the top layer from the bottom layer. In some embodiments, the top surface of the collector is separated from the bottom surface with a one or more vertical webs 112 spaced apart. In some embodiments, the top surface of the collector is separated from the bottom surface with a combination of one or more undulating surfaces and one or more vertical webs spaced apart.

The header 114 is coupled to the fluted panel 116. Fluid enters the header through a suitable plumbing fitting, travels through the header, through the fluted panel 116, enters another header (not shown), and exits through a suitable plumbing fitting of that header. In some embodiments, the system comprises plugs. In some embodiments, no plugs are required. For example, FIG. 12 shows one embodiment of a unique header to panel connection design. In some embodiments, the header preferably is piped with standard plumbing fittings on both ends of each header, for a total of four fittings so that the collector assembly can easily be ganged and also be piped in arrays for either series or parallel operation. Port holes 120 preferably are to be drilled into the header in a pattern to match the flutes 122 in the panel. The panel is preferably inserted into a slot 124 of the header where it is sealed with a sealant or other suitable method for sealing the joint. In some configurations, as pressure builds up in the header and in the panel, the panel expands and makes the joint tighter and preferably limits any leakage.

In some embodiments, the portholes are approximately inch for standard panels and are configured to convey the fluid from the header of larger size than the summation of the areas of the ports, thereby increasing the rate of flow creating turbulence in that vicinity and preferably enhancing energy collection in that area.

In some embodiments, the header is made of the same translucent material as the panel and also is exposed to the sun exposing essentially the entire surface area of the panel to the sun. Utilizing the entire exposed area of the sun to gather energy allows the collector to pick up energy from the headers, which is limited in some other technologies. In some embodiments, the panel and/or the core of the collector is coupled with the header of the collector in a suitable sealed manner.

The collector as shown in FIG. 12 is preferably suitable for both high pressure applications and low pressure applications. In some embodiments, the outflow header is identical to the inflow header and thus interchangeable. In some embodiments the first and second headers have different configurations. In some embodiments, energy is being captivated by the outflow header and/or by the inflow header.

In some embodiments, the collector comprises a translucent material. In some embodiments, the collector comprises an FRP material. In some embodiments, the collector comprises a translucent FRP material comprising a high-strength, high-temperature resin with glass content, where the translucence of the material is affected by the color of the resin, the glass loading, and/or adding a dye to achieve the final desired effect. In some embodiments, the solar collector uses a high-strength, high-temperature resin with about 30% glass content. In some embodiments, the solar collector uses a high-strength, high-temperature resin with between about 10% to about 50% glass content. In some embodiments, a high-strength resin without glass can be used to form the panel of the collector. In some embodiments, the collector comprises a thermoplastic material. In some embodiments, the collector comprises a blend of a conventional FRP resin and a thermoplastic.

In some embodiments, the collector comprises two surfaces. In some embodiments, the collector comprises three surfaces. In some embodiments, the collector comprises four or more surfaces. In some embodiments, a top surface of the collector has low light transmission from the base material's natural color, combined with incorporating a dye additive. In some embodiments, the collector comprises an intermediate undulating structure that is translucent. In some embodiments, a soluble dye can be incorporated into the fluid to provide another source of heat production. In some embodiments, the collector comprises a bottom surface of the collector that is translucent from the base material's natural color with a dark or black absorbing or reflecting surface in close proximity to the bottom surface of the container. In some embodiments, the collector comprises a bottom surface of the collector that is darkened or made black through addition of a pigment or dye.

In some undulating configurations, the ratio of attached to unattached across the width of the top or bottom surface is about ⅓. In some configurations, the ratio is about ¼. In some configurations, the ratio is less than about ½. In some embodiments, the glass content of the undulating structures can be between about 25% and about 35%. In some embodiments, the glass content of the undulating structures can be increased up to 40% or more. In some embodiments, the glass content of the undulating structures can be decreased down to 20% or less. In some embodiments, the dye content can be adjusted to optimize light transmission. In some embodiments, the top surface and the bottom surface can be attached to the undulating surface under pressure and bonded during the curing of the resin.

Figure 13:
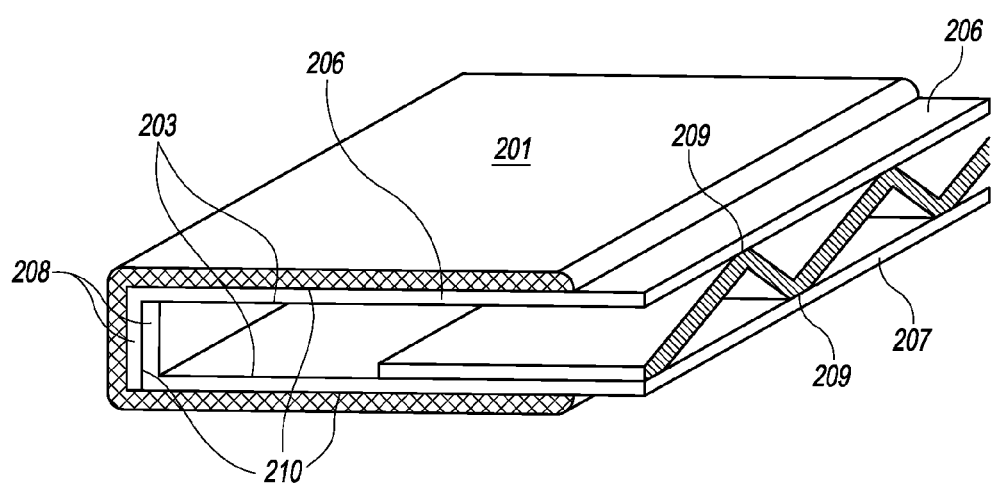

FIG. 13 illustrates an embodiment of collector that is arranged and configured in accordance with certain features, aspects and advantages of the present invention. The illustrated collector 200 incorporates a plurality of surfaces to collect and absorb heat. The top surface of the collector can be separated from the bottom surface of the collector by one or more structures that separate the top layer from the bottom layer and that provide the portion of the collector that contains the fluid and through which the fluid is pumped from the inlet to the outlet. In some embodiments, the top surface of the collector is separated from the bottom surface with a plurality of profiles of undulating structures that separates the top layer from the bottom layer. In some embodiments, the top surface of the collector is separated from the bottom surface with a one or more vertical webs spaced apart. In some embodiments, the top surface of the collector is separated from the bottom surface with a combination of one or more undulating surfaces and one or more vertical webs spaced apart.

In some embodiments, as shown in FIG. 13, the header compartment 203 preferably comprises a top collector/header panel 206 and bottom collector/header panel 207. The overlapping panel portions 208 are preferably bonded with a structural adhesive. A structural C-channel 201 preferably encapsulates the top collector/header panel 206 and bottom collector/header panel 207, where by the C-channel legs extend over the header and collector rib/panel interfaces 209. Structural adhesive preferably bonds the structural C-channel to the top collector/header panel and bottom collector/header panel.

In some embodiments, the structural C-channel preferably increases the load carrying capacity of the top and bottom collector/header panels at the ends of the collector, providing structural bracing where collector pressures are greatest. This design is well-suited for medium pressure solar thermal collector and system applications. However, this design may also be suitable for higher and/or lower pressure applications in some configurations.

In some embodiments, the rectangular header compartment configuration enables the use of common C-channel structural shapes which may comprise any number of reinforced plastic or other structural materials. In some embodiments, there are no flow restrictions at the collector to header transitions. Applications where no flow restrictions are present may offer a system advantage, due to low head (pressure) and/or less expensive operating system/pump requirements, in some embodiments.

According to some embodiments, this design preferably enables entry into markets previously inaccessible to prior art such as flat-plate solar collectors, due to the collector's ability to operate in more demanding operating conditions of higher pressure and heat. The cost may be kept low due to combining the construction of the top and bottom panels with the header and the configuration is well-suited for scale up to high-volume continuous production methods such as extrusion or pultrusion in some embodiments. Accordingly, there are marketing, manufacturability, and production scale up advantages associated with the disclosed header to collector panel connections.

Figure 14:
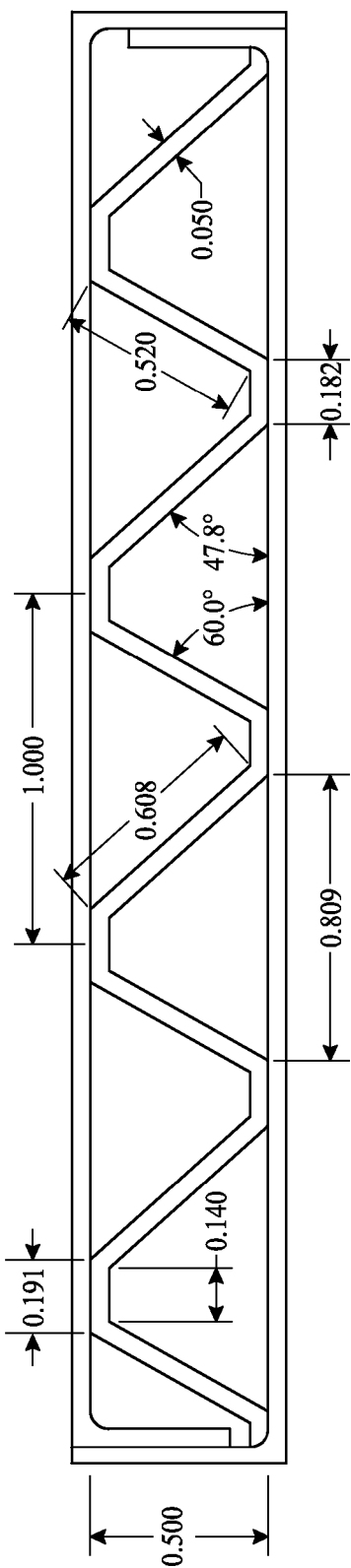

FIG. 14 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector comprises a panel having an unbalanced profile as shown.

Figure 15:
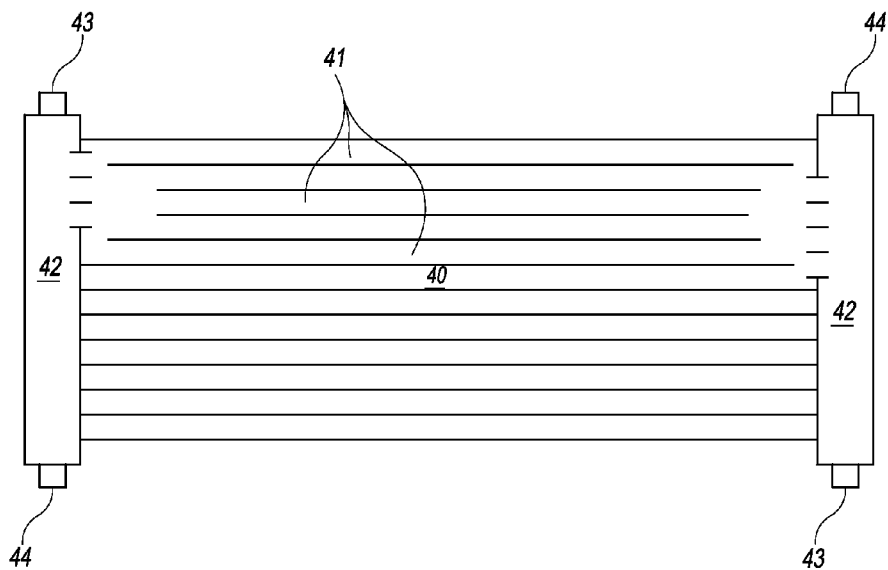

FIG. 15 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector comprises an oblong projection that is attached where the header meets the fluted panel, with the projection having a ratio of 2 to 1 with the length of the largest dimension, e.g. 2, is in the direction of the fluid flow through the fluted panel, and with a width and depth of 1. The projection is shown by a cut away at both ends for two or three flutes. In some embodiments, the oblong projection can be in the middle of the flutes.

Figure 16:
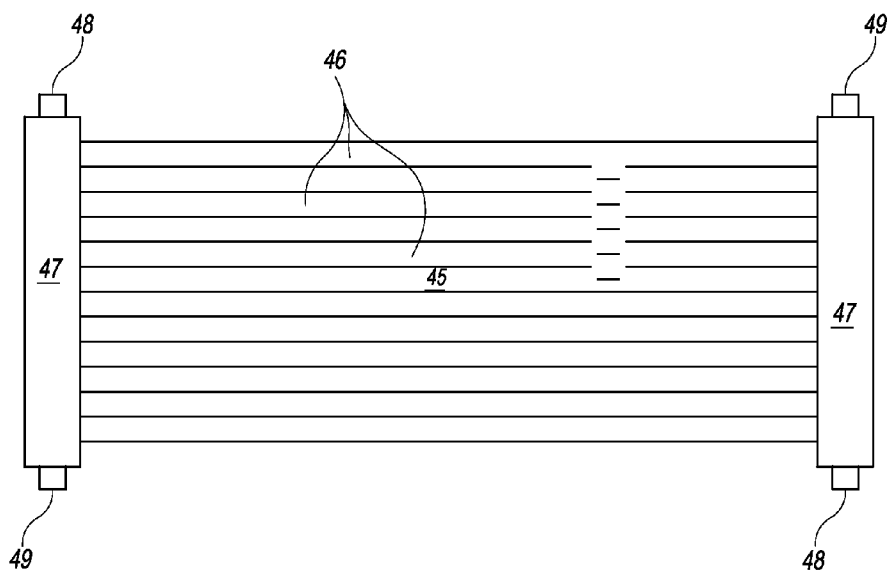

FIG. 16 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector comprises a design similar to the design of FIG. 15, except that the oblong projection described is shown by a cut away in a midway point between the headers.

Figure 17:
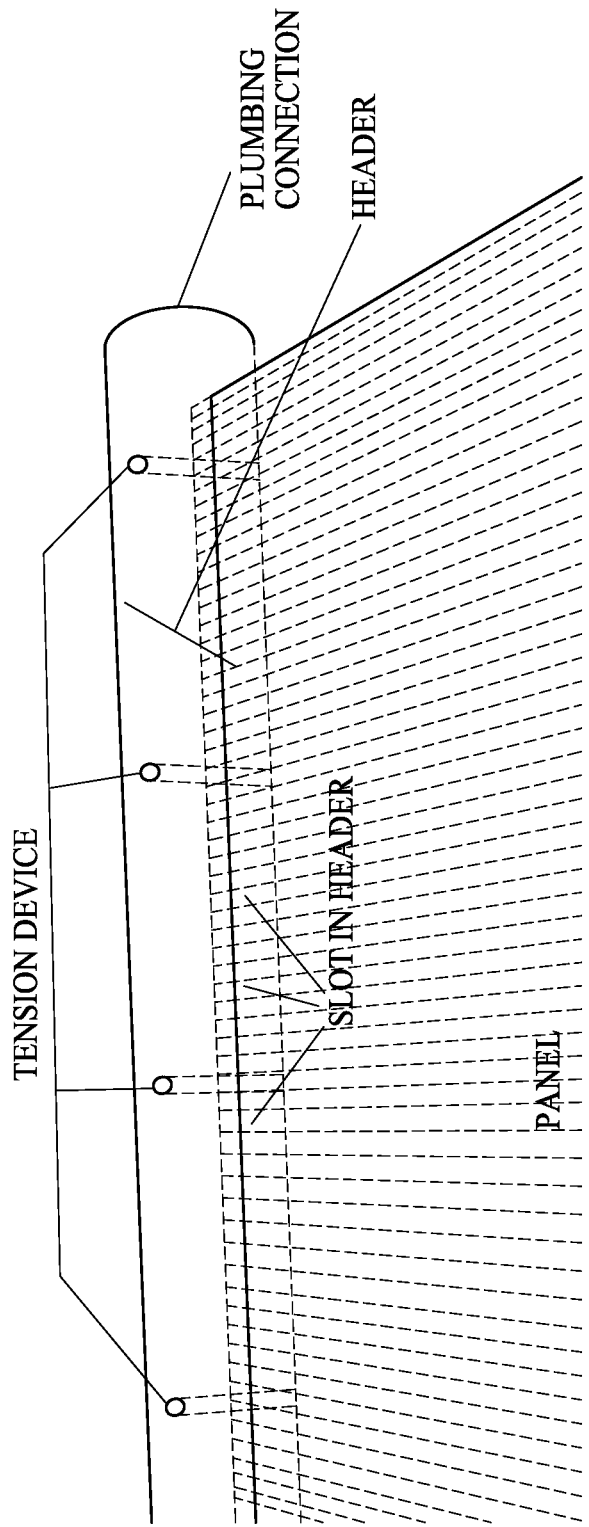
Figure 18:
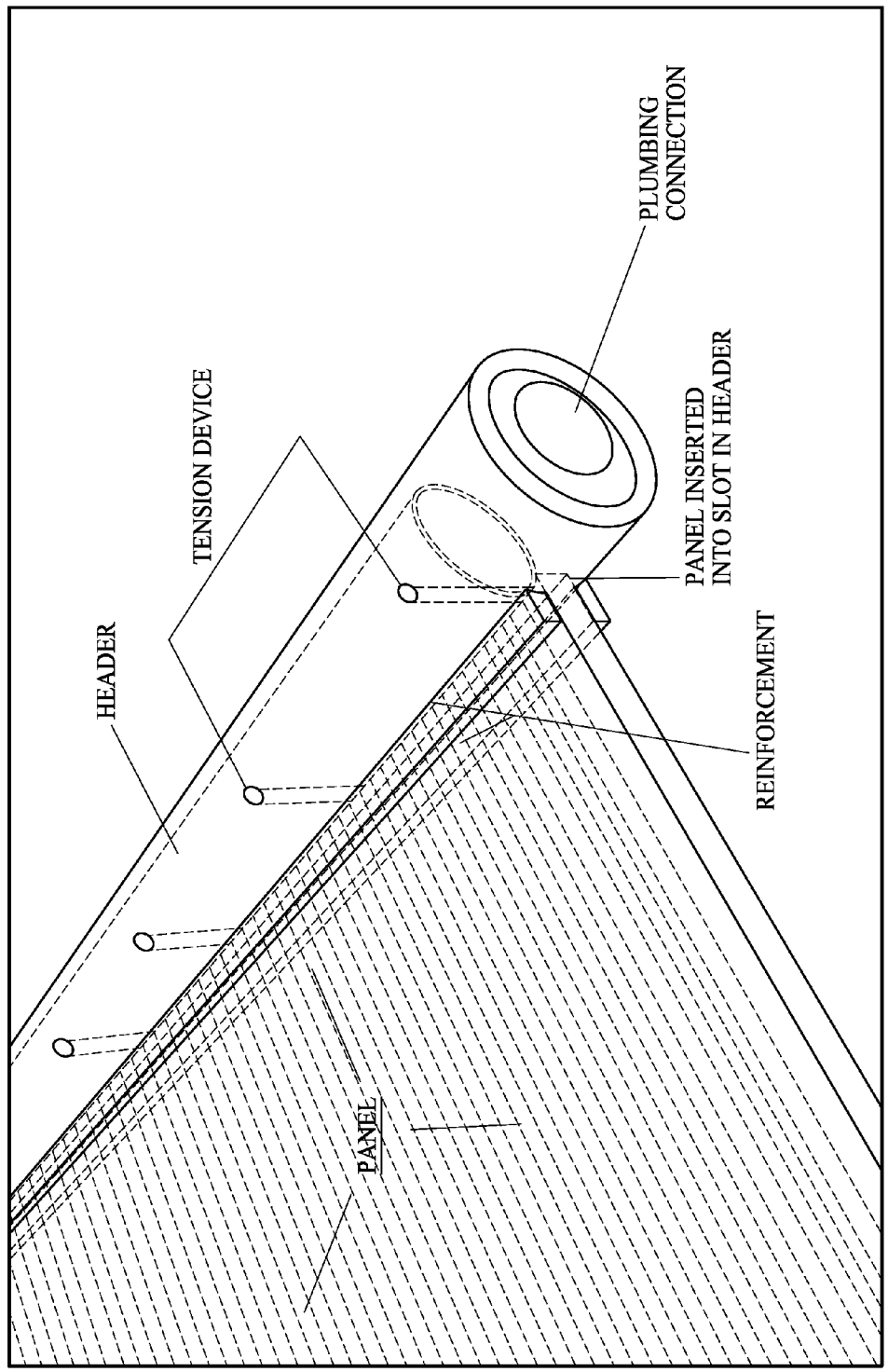
Figure 19:
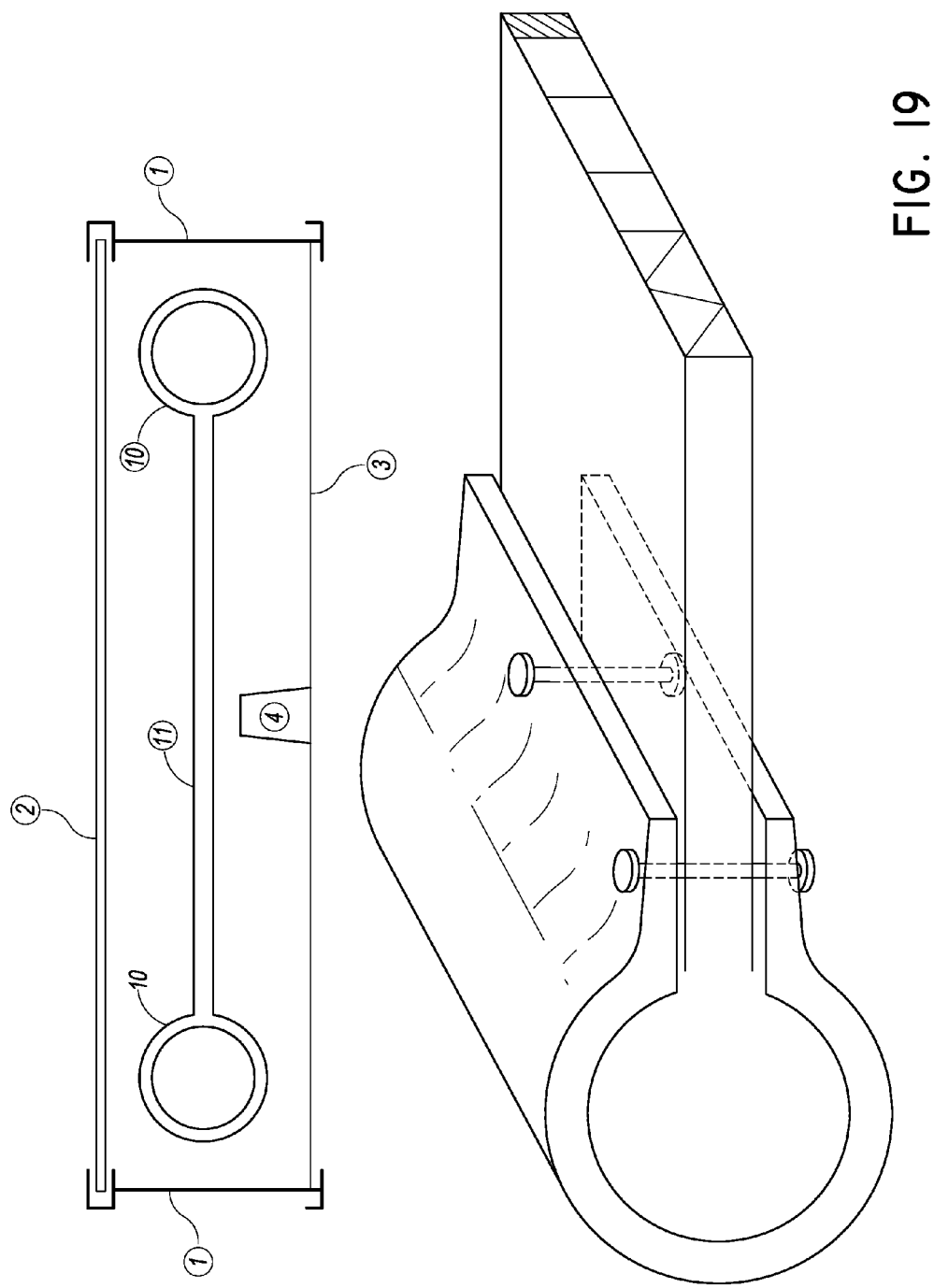

FIGS. 17-19 illustrate embodiments of collectors that are arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector comprises a header and its connection to fluted panel is subjected to large expansive forces of fluids which spread the header slot. This spreading force can easily exceed 5,000 lbs in a slotted header 48 inches long, in some embodiments, such as shown in FIG. 4, for example.

Adhesives and external reinforcements have been unable to prevent leakage in plastic type solar collectors due to challenges presented by the high pressures and temperatures developed in some embodiments. FIGS. 17-19 depict unique solutions to solving leakage and increasing the allowable working pressures in the panel. FIGS. 17 and 18 show a fabricated header to fluted panel connection forming the collector. FIG. 19 comprises a cross section of a solar collector which includes the collector and an isometric view of the header to fluted panel connection where tension device options are shown installed in any area of the header where necessary or desired.

In some embodiments, collectors preferably comprise tension devices installed as necessary in a header to fluted panel connection of a collector as referenced in FIGS. 17-19 to offset the internal pressures, to minimize the stress on the plastics and adhesive, to combat the expansion forces, and greatly improving the capacity to handle high pressures and temperatures developed in plastic solar collectors.

Figure 20:
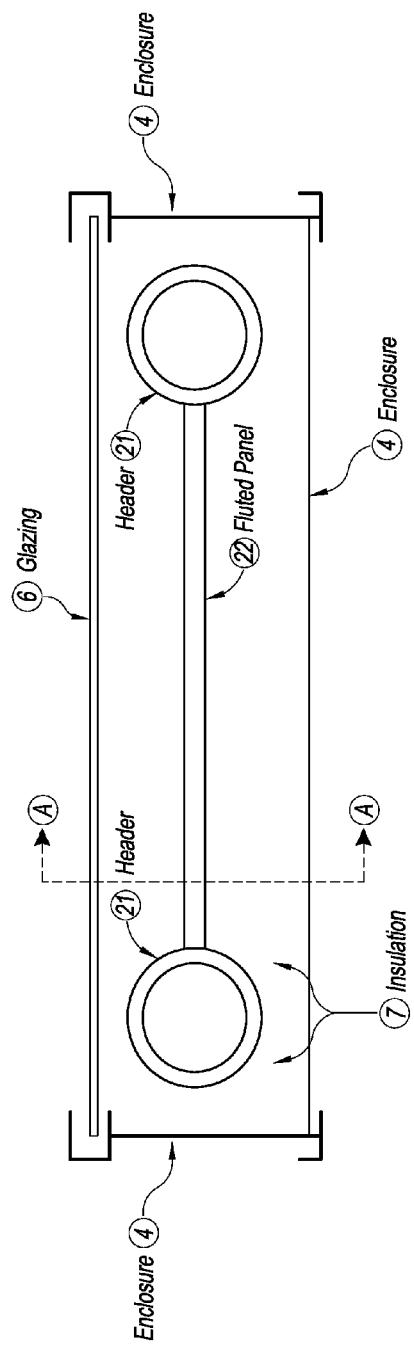

FIG. 20 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector system comprises an enclosure, insulation, glazing, as well as the headers and fluted panel forming the collector.

Figure 21:
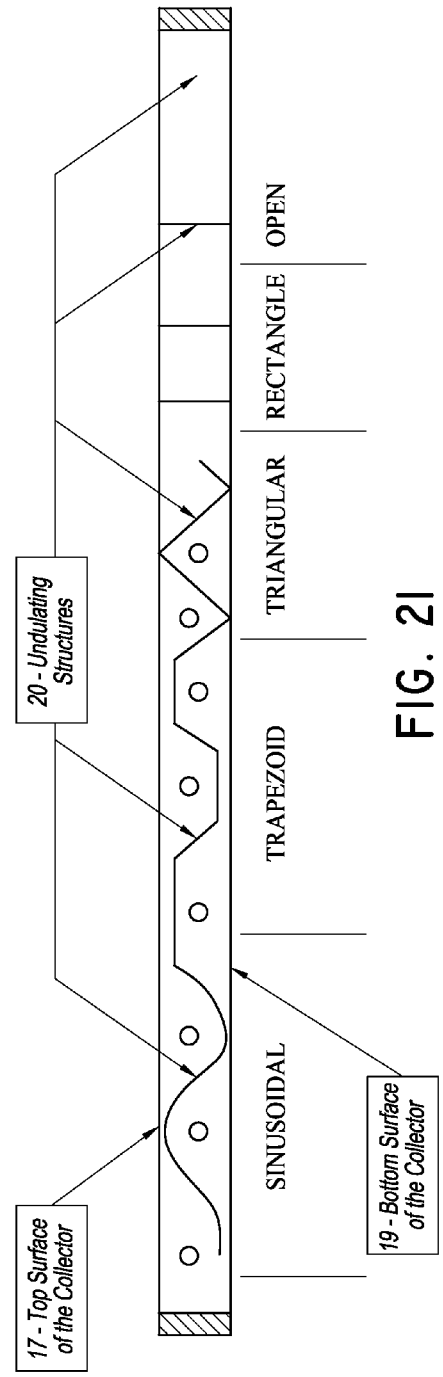

FIG. 21 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector comprises examples of fluted panel variations in the configuration of the structures within the fluted panel. For example, FIG. 21 preferably is a cross sectional view of the fluted panel of FIG. 20.

In some embodiments, aside from the materials of construction for the solar thermal collector, darkened fluids, coloration of plastic materials, the fluted panel utilizes light enhancing and light absorbing materials which directly delivers heat to the solar fluids. As shown herein panel embodiments described herein can have various configurations, for example, the panel of FIG. 4, which shows a 3 layered fluted panel, can be modified according to one or more of the fluted panel configurations described herein. Many configurations of three-layered and multi-layered fluted panels are contemplated. For example, sinusoidal, trapezoidal, triangular, rectangular and in essence any geometrical configuration or any combination thereof is suitable and can be advantageous in some embodiments. Heat is extracted from the fluids in the system via an operating system, one of which is represented in FIG. 5. A good operating system preferably includes in its components a good header and a good fluted panel, and their connection to one another is paramount.

Figure 22:
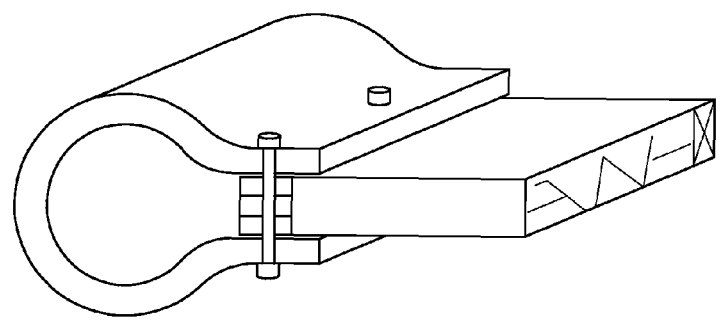
Figure 23:
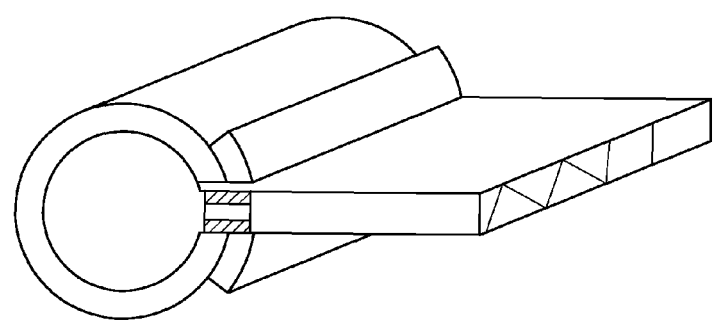
Figure 24:
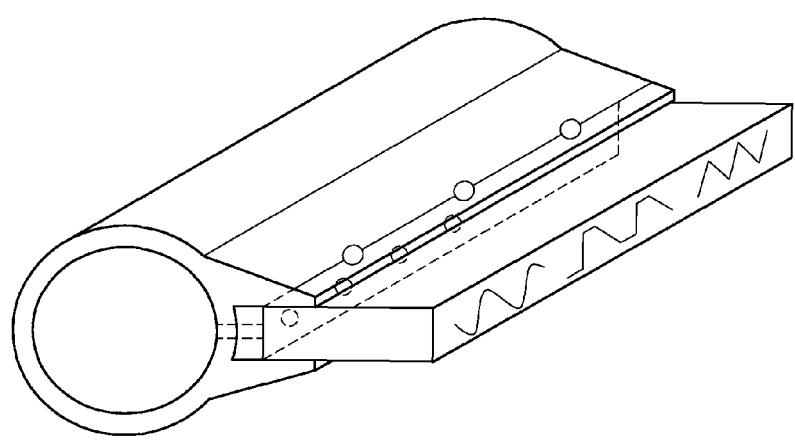

FIG. 22-24 illustrate embodiments of collectors that are arranged and configured in accordance with certain features, aspects and advantages of the present invention. The illustrated collectors are similar in some aspects to other collectors described herein. The illustrated collectors are unique in some aspects in that, in some embodiments, the collector includes the following features. In some embodiments, the collector comprises reinforcing portions, comprising one or more of pins, fasteners, connectors, abutting portions, overlays, channels, slots, sealants, openings, and flanges to achieve a suitable connection between the header and the panel.

Figure 25:
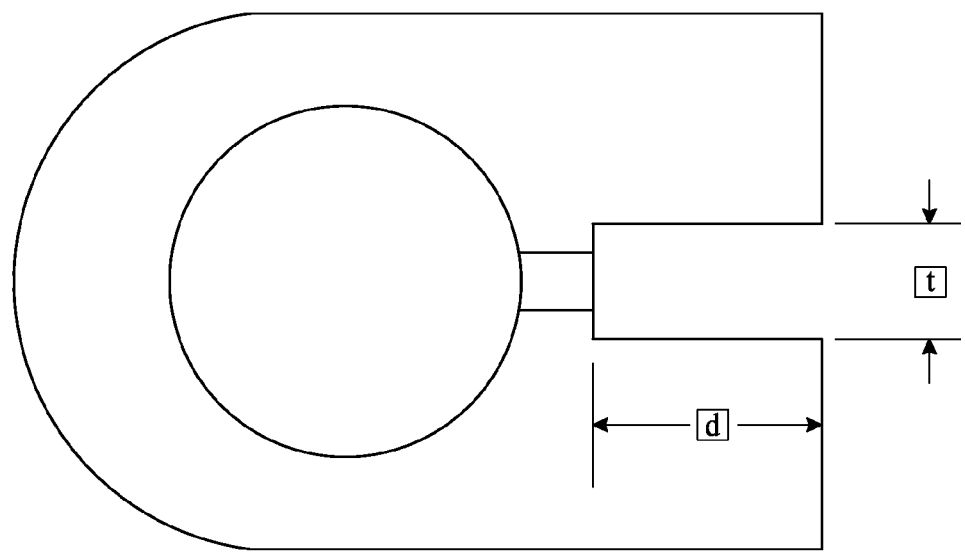

FIG. 25 illustrates an embodiment of a header that is arranged and configured in accordance with certain features, aspects and advantages of the present invention. The illustrated header is similar in some aspects to other headers described herein. The illustrated header is unique in some aspects in that, in some embodiments, the header includes the following features. In some embodiments, the header comprises a slot for the panel, a hole for fluid transfer, solid extending reinforcing portions, and a header bore.

Figure 26:
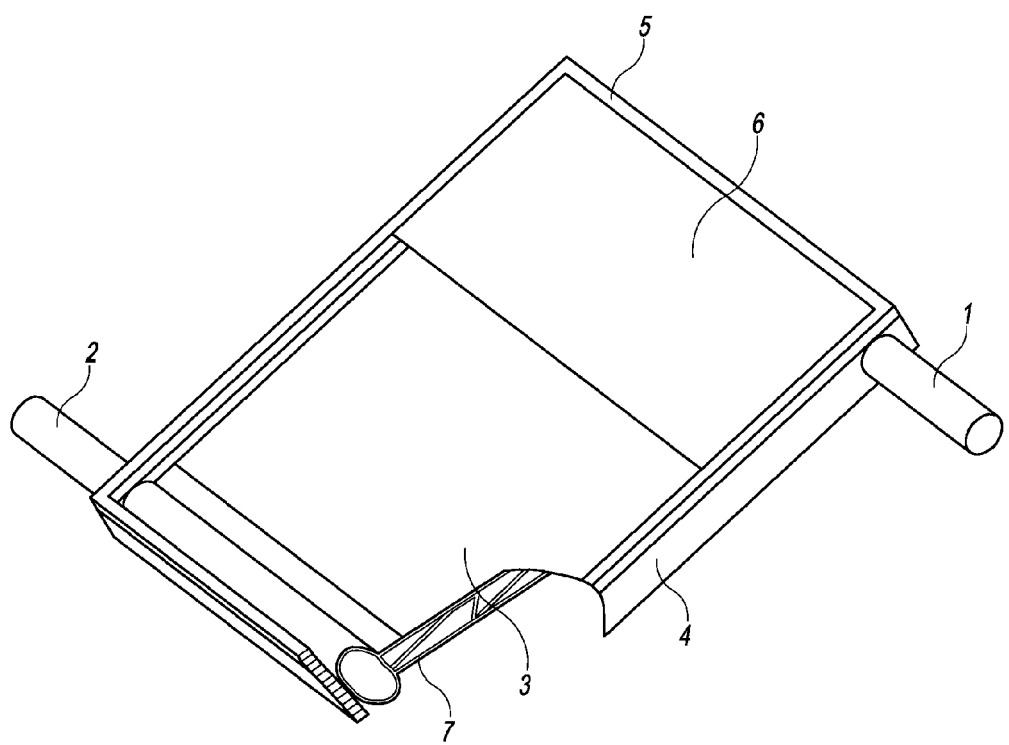

FIGS. 26-27 illustrate an embodiment of system that is arranged and configured in accordance with certain features, aspects and advantages of the present invention. The illustrated system is similar in some aspects to other systems described herein. The illustrated system is unique in some aspects in that, in some embodiments, the system includes the following features. In some embodiments, the system comprises a FRP solar collector in an enclosure designed to protect, insulate and allow the sun into the enclosure through a lens.

FIG. 28 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector comprises an unbalanced structure in the walls of a fluted panel.

Figure 29:
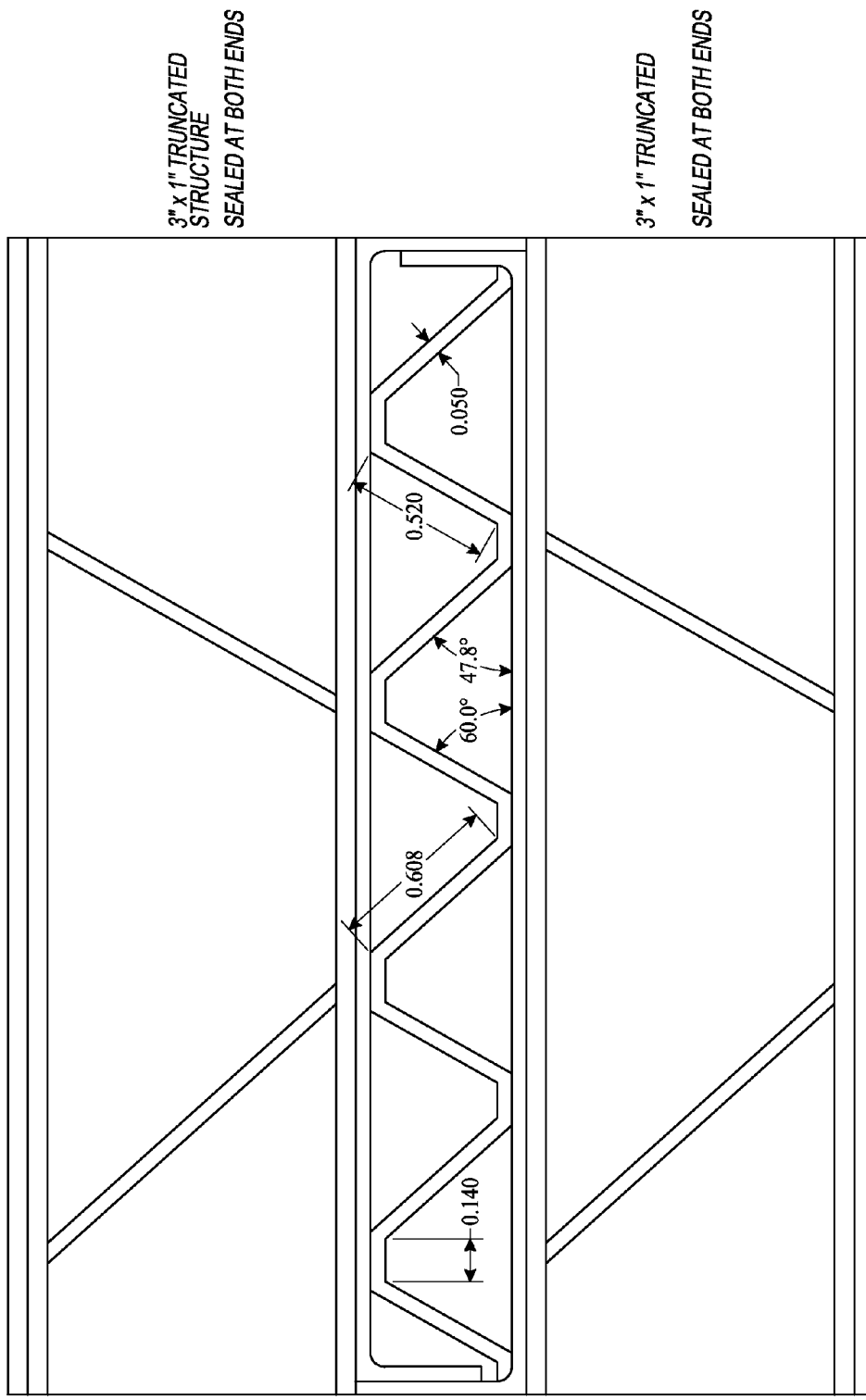

FIG. 29 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector comprises a 7 layer structure with flat structures alternating with undulating structures to both allow solar fluid to absorb energy in 1 layer and to insulate in 2 structures. In some embodiments, one or more three inch by one inch truncated structures sealed at both ends can be used in a 7 layer arrangement.

FIG. 30 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector comprises a half cylinder projection attached to the flow entrance into all the flutes from the header. In some embodiments, the panel comprises oblongs at low entrance into flutes.

Figure 31:
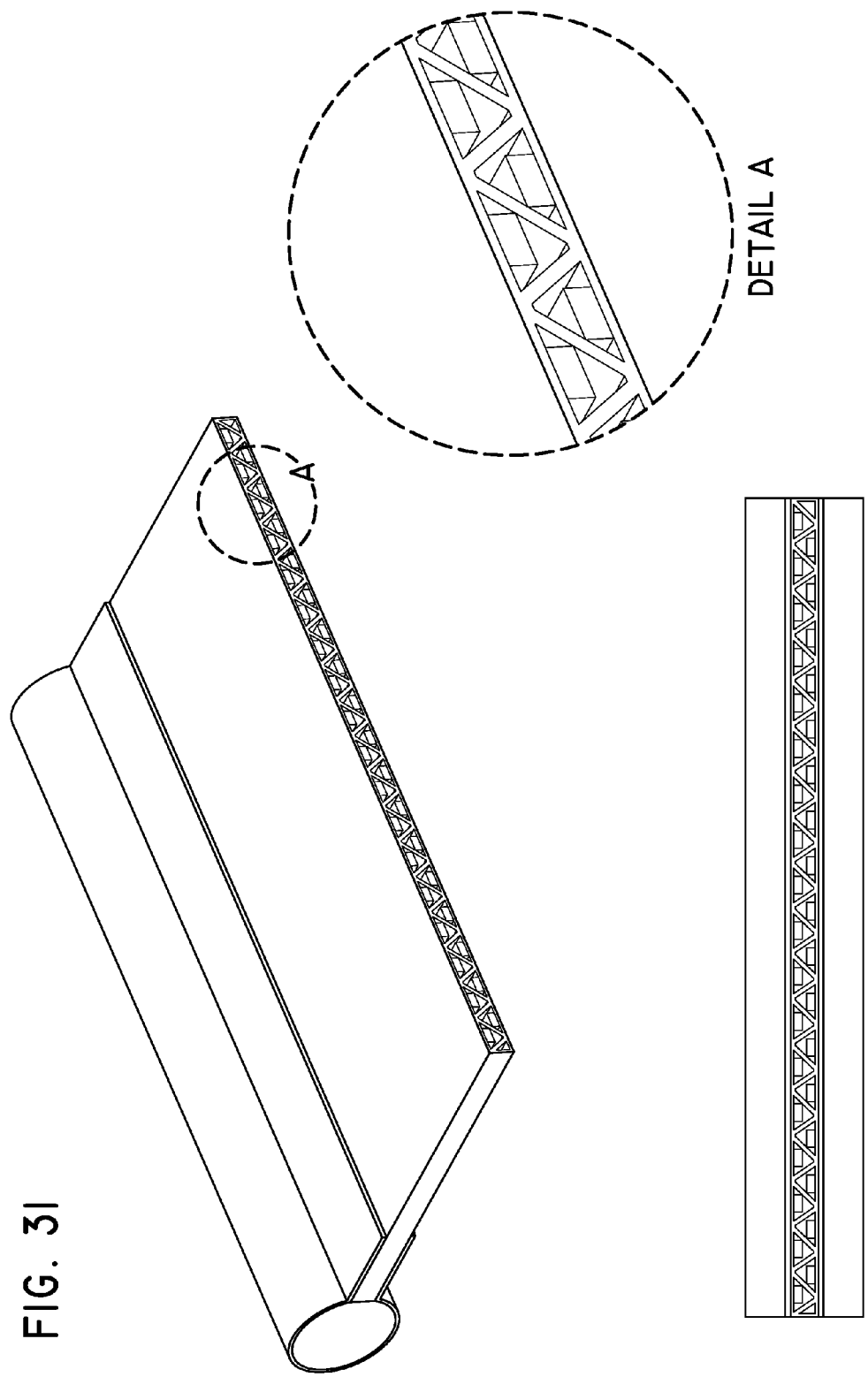

FIG. 31 illustrates an embodiment of collector that is arranged and configured in accordance with certain features, aspects and advantages of the present invention. The illustrated collector is similar in some aspects to other collectors described herein. The illustrated collector is unique in some aspects in that, in some embodiments, the collector includes the following features. In some embodiments, the collector comprise a half cylinder projection attached to a point in all flutes in the channel. In some embodiments, the panel comprises oblongs placed midway down panel flute.

General Summary of Advantageous Features Applicable to Multiple Embodiments

Many of the systems, features, materials and methods described herein can be used interchangeably as desired in unique combinations. Some embodiments, may include more or less features as desired. The following descriptions summarize aspects that may be included in some embodiments as desired.

Collector Systems Generally

According to some embodiments, a collector turns the energy from the sun into usable heat. In some embodiments, a collector is made of one or more layers to hold and advance a fluid. Collectors can preferably have up to seven layers or more. Collectors can comprise layers in which fluid is held and advanced. Collectors can comprise layers that are sealed for insulation and similar protective measures or to contain a vacuum or rare earth gas to maximize performance.

In some embodiments, collectors comprise alternating flat structures and three-dimensional undulating structures. The structures are preferably joined to make an enclosure to hold and advance a fluid. In some embodiments, flat structures can be separated by webs through which fluid flows. In some embodiments, such structures and/or portions can be modified with respect to light transmission by changing the amount of glass or other additives they contain. Collectors can achieve improved performance in some cases by incorporating additives, such as one or more dyes, pigments or other coloring agents, in the structure and/or portion thereof, and/or on the outside surface of the structure. Collectors can result in more energy from the sun absorbed in the solar fluid to allow the solar fluid to provide heat from the sun for use in a solar thermal collector system, such as a solar thermal collector system as shown in FIG. 5.

In some embodiments, a collector comprises two or more layers to hold and advance a fluid. In some embodiments, a collector comprises four to seven layers. The structure of the surface of the collector that is configured to be oriented to generally face the sun is preferably formed from material being translucent or transparent from its natural color and converted to a structure which absorbs more energy from the sun when modified with the addition of a dye or other additives to the structure. The collector has an inlet and an outlet integrally connected to a fluted panel between the inlet and the outlet. The fluted panel is configured to contain the solar fluid and forwards it through the collector as it absorbs energy from the sun and converts it to heat. The fluid preferably is used to provide hot water, heating and cooling and ramifications of these forms of energy once it exits the collector. In some embodiments, forwarding the fluid preferably utilizes a means of moving the fluid with material transfer devices such as a pump, pressurized system or gravity.

In some embodiments, a collector is designed to maximize the amount of energy absorbed in the solar fluid by modifying the light transmission and/or changing the color in the structure or portions thereof of the collector and in modification of the solar fluid with dye. The collector can be used to maximize production of heat from the sun in applications at variable latitude, longitude, climate, location, season, local orientation and similar environmental variables, to provide heat from the sun for use in a solar thermal collector system.

In some embodiments, a collector preferably comprises a fluted panel comprising three or more layers of structure. The top and bottom layers are preferably separated by an undulating structure through which the solar fluid flows. The solar fluid is configured to absorb and convert the energy from the sun to heat. The fluted panel can have a structure having a light transmission of 70% or less.

Fluted Panels

In some embodiments, a fluted panel is positioned in a structure with one or more of the surfaces facing the sun sealed on all four sides and is insulation through such means as utilizing a vacuum or an inert gas. In some embodiments, a fluted panel in a first structure facing the sun through which solar fluid flows contains a structure with a light transmission of 70% or less. In some embodiments, a fluted panel comprises up to seven layers of structure with flat structures separated by three-dimensional undulating structures and/or webs such that fluids can flow through one or more of the layers with the solar fluid flowing therein absorbing and converting the energy form the sun to heat, with other layers sealed at the ends that can be used for such functions as insulating and storing energy in the collector.

Structures

In some embodiments, a structure comprises one or more fluted panels through which fluid flows and one or more sealed layers. In some embodiments, a structure is enclosed on all four sides with a protective frame. In some embodiments, a structure has a front transparent layer facing the sun through which the energy from the sun enters the collector. In some embodiments, a structure has insulating material that is solid. In some embodiments, a structure comprises four or more layers having the four sides enclosed and overlapped and a rear surface. In some embodiments, a collector comprises two or more structures separated by webs either perpendicular to or on an angle to the structures through which the solar fluid flows and forming a channel for the solar fluid flow. In some embodiments, a collector is configured such that all surfaces, except for the surface of the structure facing the sun, are transparent. In some embodiments, a collector is configured such that all the surfaces, except for the surface of the structure facing the sun and the structure furthest from the sun, are transparent.

Orientations and Configurations

In some embodiments, a collector is configured such that a surface furthest from the sun absorbs and stores heat as energy from the sun. In some embodiments, a collector is configured such that a surface furthest from the sun reflects the energy from the sun back into the solar fluid where it is further changed into heat. In some embodiments, a collector is configured such that a surface in close proximity to the surface furthest from the sun absorbs and stores heat as energy from the sun. In some embodiments, a collector is configured such that a surface in close proximity to the surface that is furthest from the sun reflects heat as energy from the sun back into the collector. In some embodiments, a collector is configured such that the surface furthest from the sun is black or a similar highly darkened surface. In some embodiments, a collector is configured such that a surface is white or has a mirror-like finish that reflects energy from the sun back into the collector. In some embodiments, a collector is configured such that the surface furthest from the sun is transparent or translucent as an inherent characteristic of the material, and to which a dye is added to absorb energy from the sun where it will, in turn be absorbed by a dye in the solar fluid.

In some embodiments, a collector is used in conjunction with an intermittent on/off flow circulating pump or a variable speed pump. The pump can be used to move the fluid through the collector and the associated controller to control the operation of the collector in conjunction with the design of the fluted panel combined with the pulsing flow that exposes changing surfaces to the sun in the solar fluid as it transits the fluted panel in the collector.

In some embodiments, a collector comprises a header through which the fluid enters the fluted panel that exposes the fluid to the sun and another header through which the fluid flows as it exits its exposure to the sun. The header at the entrance to the fluted panel changes the direction of the flow and/or the velocity of the flow and the header at the exit changes the direction of the flow and/or the velocity of the flow.

In some embodiments, a header in the collector has a half cylinder projection attached to flutes in the flutes at or near where the header joins the inlet of the fluted panel and at the point where the fluted panel joins the header at the outlet. The projection preferably has a ratio of 2½ or more to 1, with the length of 2½ or more running in the direction of the fluid flow through the fluted panel and with the width and depth of 1.

In some embodiments, a header in the solar collector has a half cylinder projection attached to flutes in the flutes at one or more places in the undulating structure. The projection has a ratio of 2½ or more to 1, with the length of 2½ or more running in the direction of the fluid flow through the fluted panel and with the width and depth of 1.

In some embodiments, an unbalanced structure in the length of the walls of the fluted panel preferably causes a variable friction between the fluid and the walls comprising the fluted panel such that the fluid velocity varies as the solar fluid transits the fluted panel and such varying fluid velocities contribute to the changing exposure of different surfaces of the fluid to the energy from the sun.

Collector Materials

FRP Materials

According to some embodiments, a collector turns the energy from the sun into usable heat. In some embodiments, the collector is made from a material commonly referred to as a Fiberglass Reinforced Plastic ("FRP"). FRP preferably utilizes the inherent color, haze and light transmission in a translucent FRP to produce heat in a solar fluid exposed to the sun in a structure that combines the collector with a device that insulates the collector. FRP allows energy from the sun to enter the collector and is also the protective enclosure around the collector.

In some embodiments, a collector preferably comprises an FRP material made by curing a high-strength, high-temperature resistant thermosetting resin with an accelerator or catalyst and combining the thermosetting resin with additives such as UV stabilizers in the case of thermosetting resins that are not U V resistant and combining such thermosetting resin with variable amounts of glass fiber in different forms including cut fiberglass strands, continuous fiberglass strands, continuous fiberglass strands woven into an open net, etc. FRP refers to a structural fiberglass reinforced plastic or engineered structural fiberglass reinforced plastic or similar, rather than a material for less demanding applications commonly referred to as decorative fiberglass reinforced plastic.

In some embodiments, a collector preferably is made from a class of FRP materials that also has corrosion resistance, heat resistance or combined heat and corrosion resistance. The FRP preferably is configured to be used to contain a solar fluid that can reach temperatures at or above the boiling point of water without incurring significant degradation of the FRP.

In some embodiments, a collector preferably is made of a thermosetting resin with a tensile strength of 6000 psi or greater at room temperature without the addition of the glass fiber to the cured thermosetting resin, such that the cured thermosetting resin can be used without glass fiber in manufacturing the collector. In some embodiments, a collector preferably is made of FRP having fiber content less than 50% by volume.

In some embodiments, FRP material can come from resin types referred to as Epoxy, Unsaturated Polyester, Vinyl Ester, and other resins that are not opaque, and modifications and combinations thereof. In some embodiments, FRP material can comprise DION 6694, Epovia RF-1001 or Hetron 980.

In some embodiments, FRP material can come from resin types referred to as Modified Bisphenol Fumarate, Non-Accelerated Epoxy Vinyl Ester, Premium Epoxy Novolac Vinyl Ester, Premium Bisphenol-A Fumarate, Epoxy Vinyl Ester w/FCAT technology, Novolac Modified Epoxy Vinyl Ester, Epoxy Vinyl Ester, Bisphenol-A Epoxy Vinyl Ester, Novolac Epoxy Vinyl Ester and/or other resins that are not opaque, and/or modifications and combinations thereof. In some embodiments, FRP material can comprise DION IMPACT 9160, DION IMPACT 9400, DION 382-05, Hetron 922, Hetron 980/35, Derakane Momentum 411-350, Derakane 411-45, Derakane 441-400, Derakane Momentum 470-300, Derakane 470HT-400, EPOVIA KRF-1001, EPOVIA RF-1051, and/or EPOVIA KRF-1051. Suitable resins identified herein may be commercially available from one or more of Reichhold Inc., Ashland Inc., and/or CCP Composites.

As an example of the manufacturing process according to some embodiments, to produce a collector from FRP from one of the resins described herein, in the form of at least a three layer structure that combines two flat layers and one three-dimensional undulating structure, the collector can be manufactured and assembled by adding an accelerator or catalyst to an exothermic thermosetting resin. The combination can be pumped or advanced by gravity onto three or more moving belts each with tooling to define the different surfaces that comprise the fluted panel. Glass fiber is preferably randomly laid down on the moving belt. The combination of ingredients passes through tooling that facilitates the curing that either defines the structure of an undulating profile or the structure of a flat profile. The material being cured as the undulating profile and two flat profiles proceed along the moving belt at a controlled temperature such that the undulating profile and two flat profiles are sufficiently cured to have structural integrity but are still tacky as pinch rolls sandwich the undulating profile between the two flat profiles. The joining being accomplished through directly applied pressure until the structure is fully cured or through use of an adhesive with an essentially fully cured integral surfaces. Such a completed fluted panel can be connected to a header on both ends of the fluted panel. The header can be made of FRP materials used for the fluted panel. The header can be made by pultrusion in the shape of a cylindrical pipe with lips protruding that sandwich end caps through which holes are drilled and attached with adhesive to both ends of the fluted panel by a combination of curing and sealant.

In some embodiments translucent panels commercially available from Major Industries in Wausau, Wis., such as, for example the product Guardian 275 translucent panels, can be used for collector systems. These products are based on FRP materials and can provide a protective covering in a strong water tight system. A range of colors are available. The FRP material in some embodiments is durable and can be expected to be used for up to 20 years or more. In some embodiments, the material is made from a high-strength FRP and suitable resins as described herein.

Thermoplastic Materials

According to some embodiments, a collector turns energy from the sun into usable heat. The collector preferably is made from a thermoplastic from the category of thermoplastics known as high-temperature thermoplastics. The thermoplastic has the ability to reach temperatures at and above the boiling point of water. The collector contained in a structure that combines the collector with a device that insulates the collector, allows energy from the sun to enter the collector, and is also the protective enclosure around the collector. This combination can be referred to as a solar collector. Material in the surface of the structure of the collector facing the sun uses the inherent light transmission and color of the thermoplastic. The material may be either transparent or translucent and may be modified with additives such as dyes or pigments or other coloring agents herein referred to as "dye" either in the structure or portion thereof or on the outside surface of the structure. Such modification may change a transparent material to a translucent material, with the translucent material configured to produce heat in a solar fluid exposed to the sun that converts energy from the sun into usable heat.

In some embodiments, the collector preferably comprises Polysulfone or other thermoplastics that have limited UV stability. The thermoplastic can incorporate a UV stabilizer in a polysulfone film that has been laminated to the side of the collector that is facing the sun, or coating the surface facing the sun with a translucent material containing a UV stabilizer, or laminating a translucent film of a UV resistant material to the surface of the polysulfone facing the sun, or laminating a film to the surface of the polysulfone facing the sun. The film can be made of a transparent or translucent plastic to which a UV stabilizer has been added.

In some embodiments, the collector is made from polysulfone combined with one or more engineering thermoplastics and/or high-temperature thermoplastics having a refractive index similar to that of Polysulfone. The thermoplastic can be intimately blended with Polysulfone to maintain translucency, or from a combination of Polysulfone with one or more engineering thermoplastics or high-temperature thermoplastics, analogous to or having the characteristics of interpenetrating polymer networks that maintains the translucence of an otherwise opaque, partially incompatible thermoplastic.

In some embodiments, the collector is preferably made from a class of thermoplastics commonly referred to as high-temperature thermoplastics, as opposed to engineering thermoplastics, such material being made from Polysulfone, either by itself or combined with other high-temperature thermoplastics with a refractive index similar to that of Polysulfone, such as Polyetherimide or with engineering plastics such as Polyethylene Terephthalate, Styrene Maleic Anhydride, High-Temperature Polycarbonate and similar materials intimately blended with the Polysulfone so that it makes a translucent or transparent material analogous to or having the characteristics of interpenetrating polymer networks that also maintains the translucence of an otherwise opaque, partially incompatible thermoplastic In some embodiments, the collector is made from a class of thermoplastics commonly referred to as high-temperature thermoplastics as opposed to engineering thermoplastics, such material being made from Polyetherimide, either by itself or with other high-temperature thermoplastics with a refractive index similar to that of Polyetherimide, such as Polysulfone or with engineering plastics such as Polyethylene Terephthalate, Styrene Maleic Anhydride, High-Temperature Polycarbonate and similar materials intimately blended with the Polyetherimide so that it makes a translucent material analogous to or having the characteristics of interpenetrating polymer networks that also maintains the translucence of an otherwise opaque, partially incompatible thermoplastic. In some embodiments, a suitable material for a collector comprises Polysulfone UDEL P1700, Poletherimide ULTEM HU1000, Polyethylene Terephthalate RYNITE 540 SUV BK 544, Styrene Maleic Anhydride XIRAN SE700, Polycarbonate LEXAN LUX 2110T.

In some embodiments, the collector comprises Polyethylene Terephthalate Eastapak Polymer 9221. In some embodiments, the collector comprises Polycarbonate LEXAN XHT 2141. These and/or other thermoplastic materials can incorporate a UV stabilizer in a film that has been laminated to the side of the collector that is facing the sun, or coating the surface facing the sun with a translucent material containing a UV stabilizer, or laminating a translucent film of a UV resistant material to the surface facing the sun, or laminating a film to the surface facing the sun. The film can be made of a transparent or translucent plastic to which a UV stabilizer has been added.

As an example of the manufacturing process according to some embodiments, to produce a thermoplastic collector, the fluted panel can be extruded through a profile die that combines at least three structures in one step. The profile process preferably has multiple side and center feed extruders should the fluted panel have two or more different colored structures. The structures are bonded to each other as they flow through the die. The fluted panel can be cut as the fully formed fluted panel reaches the desired length near the end of the extruder. The header is preferably formed separately from a profile extruder similar to that used to extrude pipe except with the profile having lips as shown in some embodiments. The header can be attached to the fluted panel at about a 90 degree angle to the direction used to extrude the fluted panel. Bonding can take place while the header lips are at an elevated temperature resulting in the inner lip surface being semi-molten such that pressure attaches the header to fluted panel.

Collector Dyes

In some embodiments, a collector comprises a dye that is added to the material in one or more translucent or transparent structures of the collector. In some embodiments, the dye encompasses the visible spectrum range and also incorporates the UVA, UVB and UVC ultra violet spectrums and near infrared spectrums. Such dye preferably having wavelengths that are in the green, blue-green, blue or violet range.

In some embodiments, a dye that is added to the material in one or more structures of the collector has wavelengths that are in the pink, tan, amber and bronze secondary or teritary colors. In some embodiments, a dye that is added to the material in one or more structures of the collector has wavelengths between 370 and 560 nm that are in the green, blue-green, blue or violet range. In some embodiments, a material in one or more of the structures of the collector has a dye resulting in the structure having spectrophotometric wavelengths between 590 nm and 760 nm. In some embodiments, a material in one or more of the structures of the collector has a dye resulting in the structure having spectrophotometric wavelengths between 370-560 nm and 590-760 nm.

In some embodiments, a collector comprises structures comprising dye from the family of products generally referred to as Pond Dyes, Lake and Pond Dyes, or similar, having a wavelength in the range of about a nominal 400 nm to a nominal 700 nm. For example, in some embodiment, the dye can be Jet Black Lake and Pond Dye.

Spectral and Multi-Surface Characteristics of Collector Materials and Dye

Figure 32:
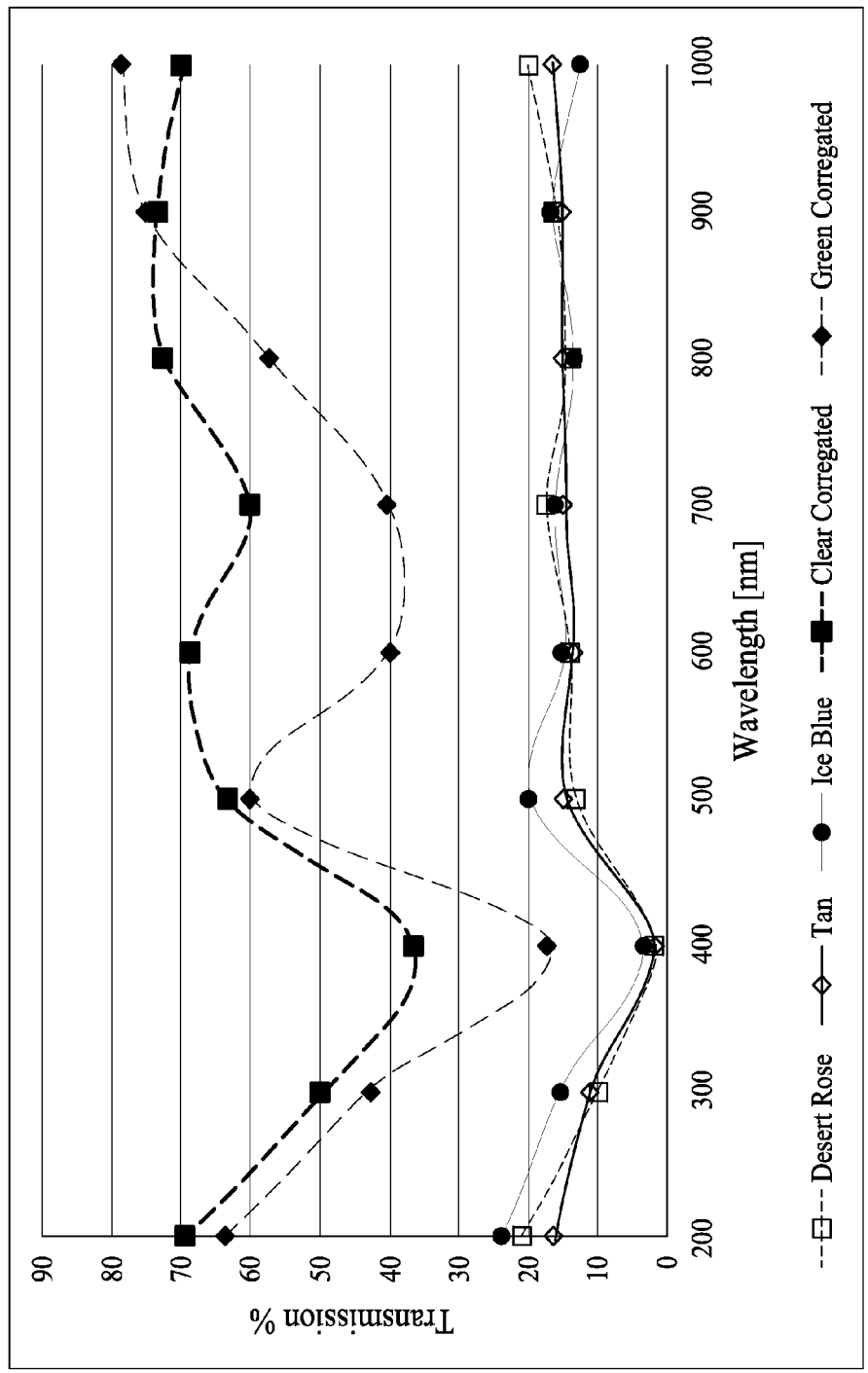
FIG. 32 is a representation of spectral characteristics of dyes according to some embodiments.

In some embodiments, a solar fluid comprises dye, wherein the dye comprises generic color data. A dye can be added to the material in one or more translucent or transparent structures of the collector such that the dye encompasses the visible spectrum range. FIG. 32 and Tables 1 and 2 provide data regarding dyes.

In some embodiments, a solar fluid comprises dye, wherein the dye comprises specified spectral color data. A dye can be added to the material in one or more translucent or transparent structures of the collector such that the clear dyed structure is characterized by the spectral data shown in FIG. 32 and Tables 1 and 2 below.

A dye can be added to the material in one or more translucent or transparent structures of the collector such that a clear dyed structure is characterized by the spectral data shown in FIG. 32 and Tables 1 and 2 below.

A dye can be added to the material in one or more translucent or transparent structures of the collector such that a (desert) rose dyed structure is characterized by the spectral data shown in FIG. 32 and Tables 1 and 2 below.

A dye can be added to the material in one or more translucent or transparent structures of the collector such that a green dyed structure is characterized by the spectral data shown in FIG. 32 and Tables 1 and 2 below.

A dye can be added to the material in one or more translucent or transparent structures of the collector such that a (ice) blue dyed structure is characterized by the spectral data shown in FIG. 32 and Tables 1 and 2 below.

A dye can be added to the material in one or more translucent or transparent structures of the collector such that a tan dyed structure is characterized by the spectral data shown in FIG. 32 and Tables 1 and 2 below.

Table 1 and FIG. 32 contain transmission data collected at various wavelengths using a Spectronic 21D spectrophotometer. All measurements are percent transmission through a dyed sample with thickness 1/16 inch, calculated relative to the transmission measured through an equivalent thickness of air.

TABLE 1

| | Wavelength [nm] | | | | | | | | |
|---|---|---|---|---|---|---|---|---|---|
| | 200 | 300 | 400 | 500 | 600 | 700 | 800 | 900 | 1000 |
| Desert Rose | 20.9 | 10.0 | 2.6 | 13.2 | 14.5 | 17.5 | 14 | 16.3 | wa |
| Tan | 16.4 | 11.3 | 1.8 | 14.8 | 13.6 | 14.7 | 15.1 | 15.2 | 16.6 |
| Ice Blue | 23.6 | 15.5 | 3.6 | 19.7 | 15 | 16.2 | 13.6 | 16.5 | 12.5 |
| Clear Corregated | 69.5 | 49.8 | 36.5 | 63.3 | 68.8 | 60.2 | 72.5 | 73.7 | 69.7 |
| Green Corregated | 63.7 | 42.8 | 17.2 | 59.8 | 40.1 | 40.3 | 57.4 | 75.2 | 78.6 |

Table 2 gives the overall percent transmission, as measured across the visible spectrum, through a 1/16 inch sample of the dyed material. The light source was an artificial sun lamp equipped with an AM 1.5 filter.

TABLE 2

| Sample color | % Transmission |
|---|---|
| Clear | 78.9 |
| Desert Rose | 29.5 |
| Green | 81.0 |
| Ice Blue | 50.3 |
| Tan | 40.0 |

Solar Fluids

In some embodiments, a solar fluid is preferably used to obtain energy from a collector. The solar fluid can be a water-based fluid. A water-based solar fluid can comprise a mixture of water and glycol. A water-based solar fluid can comprise a glycol additive that is propylene glycol. A water-based solar fluid can comprise water having a Calcium Carbonate hardness of 121 to 240 mg/L. In some embodiments, the water-based solar fluid comprises water having a Calcium Carbonate hardness of 61 to 120 mg/L. In some embodiments, the water-based solar fluid comprises water having a Calcium Carbonate hardness of 60 mg/L or less. In some embodiments, the water-based solar fluid comprises a fluid commonly referred to as de-ionized water. In some embodiments, the water-based solar fluid comprises a fluid commonly referred to as distilled water. In some embodiments, the water-based solar fluid comprises a fluid commonly referred to as a brine solution.

In some embodiments, a solar fluid comprises a hydrocarbon-based fluid. In some embodiments, a solar fluid comprises mineral oil. In some embodiments, a solar fluid comprises neither a hydrocarbon-based fluid nor a water-based fluid. In some embodiments, a solar fluid comprises a dye added to absorb energy from the sun. In some embodiments, a solar fluid comprises a dye from the family of products generically referred to as Pond Dyes, Lake and Pond Dyes, or similar, such dye having a wavelength in the range of a nominal 400 nm to a nominal 700 nm. In some embodiments, a solar fluid comprises Jet Black Lake and Pond Dye.

In some embodiments, a solar fluid comprises dye, wherein the dye comprises Jet Black Lake and Pond Dye and has characteristics as described in the Table 3 below showing Spectrophotometric Readings for Wavelength of Jet Black Lake and Pond Dye.

TABLE 3

| Dye Concentration | Wavelength [nm] | | | | |
|---|---|---|---|---|---|
| [g L$^{-1}$] | 400 | 500 | 550 | 600 | 700 |
| 1 | 0% | 0% | 0% | 0% | 55% |
| 0.2 | 11% | 0% | 7.9% | 5.3% | 95% |
| 0.02 | 62% | 34% | 61% | 52% | 99% |
| 0.002 | 97% | 91% | 96% | 95% | 100% |
| 0.0002 | 99% | 99% | 100% | 99% | 100% |
| 0.0000002 | 100% | 100% | 100% | 100% | 100% |

Conclusion

Examples of collector systems and associated components and methods are described herein. The figures show various systems and modules and connections between them. The various modules and systems can be combined in various configurations and connections between the various modules and systems can represent physical or logical links. The representations in the figures have been presented to clearly illustrate the principles of how to provide and use desirable collector and heating systems, process water in a relatively quick and efficient manner, and details regarding systems, methods and features have been provided for ease of description rather than attempting to delineate separate physical embodiments.

The examples and figures are intended to illustrate and not to limit the scope of the inventions described herein. Although certain preferred embodiments and examples are disclosed herein, inventive subject matter extends beyond the specifically disclosed embodiments to other alternative embodiments and/or uses, and to modifications and equivalents thereof. Thus, the scope of the claims appended hereto is not limited by any of the particular embodiments described herein. For example, in any method or process disclosed herein, the acts or operations of the method or process can be performed in any suitable sequence and are not necessarily limited to any particular disclosed sequence. Various operations can be described as multiple discrete operations in turn, in a manner that can be helpful in understanding certain embodiments; however, the order of description should not be construed to imply that these operations are order dependent. Additionally, the structures described herein can be embodied as integrated components or as separate components. For purposes of comparing various embodiments, certain aspects and advantages of these embodiments are described. Not necessarily all such aspects or advantages are achieved by any particular embodiment. Thus, for example, various embodiments can be carried out in a manner that achieves or optimizes one advantage or group of advantages as taught herein without necessarily achieving other aspects or advantages as can also be taught or suggested herein.

Various embodiments have been described in terms of the functionality of such embodiments in view of the general interchangeability of hardware. The methods and processes described herein are also not limited to any particular sequence, and the blocks, steps, or states relating thereto can be performed in other sequences that are appropriate, for example, in some other manner. The various elements, features and processes described herein may be used independently of one another, or may be combined in various ways. All possible combinations and subcombinations are intended to fall within the scope of this disclosure. Further, nothing in the foregoing description is intended to imply that any particular feature, element, component, characteristic, step, module, method, process, task, or block is necessary or indispensable. The example systems and components described herein may be configured differently than described. For example, elements or components may be added to, removed from, or rearranged compared to the disclosed examples.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" or "an" as used in this application and the appended claims are to be construed to mean "one or more" or "at least one" unless specified otherwise.

As used herein, the terms "comprises," "comprising," "includes," "including," "has," "having" or any other variation thereof, are open-ended terms and intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present). As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

The foregoing disclosure, for purpose of explanation, has been described with reference to specific embodiments, applications, and use cases. However, the illustrative discussions herein are not intended to be exhaustive or to limit the inventions to the precise forms disclosed. Many modifications and variations are possible in view of the above teachings. The embodiments were chosen and described in order to explain the principles of the inventions and their practical applications, to thereby enable others skilled in the art to utilize the inventions and various embodiments with various modifications as are suited to the particular use contemplated.

Certain features, aspects and advantages of the present invention came from a combination of sound structural engineering and creative thinking that would make conditions conducive to maximize or at least significantly increase heat capture in a lightweight solar collector. Some results were by design and some were completely and pleasantly unexpected. A good example of scientific creativity can be seen in combining the FRP embodiments of variable, pulsed on-and-off flow of the solar fluids with a design of the system, as described earlier, that improves the efficiency of the collector.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present is intended to be defined by the claims.

What is claimed is:

1. A solar thermal collector system comprising:
    a solar thermal collector having a fiberglass reinforced plastics (FRP) panel, wherein the FRP panel comprises a first FRP layer and a second FRP layer, wherein the first and second FRP layers are arranged in a spaced relationship in the solar thermal collector such that the first and second FRP layers define at least one channel between the first and second FRP layers, wherein the at least one channel is adapted for fluid to circulate in the channel between the first and second FRP layers in the solar thermal collector, wherein the first FRP layer is a translucent layer; and wherein the first translucent FRP layer is a colored layer;
    wherein the FRP panel comprises a third FRP layer, wherein the third FRP layer is an undulating layer, wherein the third FRP layer is arranged in the solar thermal collector such that the third FRP layer is positioned between the first and second FRP layers, wherein the third FRP layer defines at least one channel between the third FRP layer and one or more of the first and second FRP layers, wherein the at least one channel is adapted for fluid to circulate in the channel between the third FRP layer and one or more of the first and second FRP layers in the solar thermal collector.

2. The system of claim 1, wherein the FRP panel comprises one or more of a high-strength resin, a high-temperature resin, a corrosion-resistant FRP material, a heat-resistant FRP material, a combined corrosion-resistant and heat-resistant FRP material, and an ultra-violet (UV) resistant FRP material.

3. The system of claim 1, wherein the FRP panel comprises about 10% to about 50% fiber content.

4. The system of claim 1, wherein the FRP panel comprises a dye.

5. A method for heating fluid comprising:
    providing a solar thermal system comprising a solar thermal collector having a fiberglass reinforced plastics (FRP) panel, wherein the FRP panel comprises a first FRP layer and a second FRP layer, wherein the first and second FRP layers are arranged in a spaced relationship in the solar thermal collector such that the first and second FRP layers define at least one channel between the first and second FRP layers, wherein the at least one channel is adapted for fluid to circulate in the channel between the first and second FRP layers in the solar thermal collector, wherein the first FRP layer is a translucent layer; and wherein the first translucent FRP layer is a colored layer; and heating fluid circulating through the solar thermal system; wherein circulating the fluid flow comprises providing one or more of a turbulent flow and a pulsing flow.

6. The method of claim 5, wherein the fluid comprises a dye.

7. The method of claim 6, wherein the dye has a spectrophotometric wavelength between about 400 nm and about 700 nm.

8. The system of claim 1, wherein the third FRP undulating layer comprises one or more of the following configurations: a sinusoidal shape, a trapezoidal shape, a triangular shape, and a rectangular shape.

9. The system of claim 1, wherein the third FRP undulating layer comprises a dye.

10. A method for manufacturing a portion of a solar thermal collector system comprising:

coextruding first, second and third layers of one or more materials forming a panel wherein the third layer is an undulating layer and is positioned between the first layer and the second layer, wherein the one or more materials is selected from the group consisting of a colored translucent FRP material; a colored translucent thermoplastic blend of polysulfone, polyethylene terephthalate and styrene maleic anhydride; and a colored translucent thermoplastic blend of polyetherimide, polyethylene terephthalate and styrene maleic anhydride; thereby forming a colored translucent panel;

wherein at least one of the colored layers has a spectrophotometric wavelength between about 370 nm and about 760 nm.

11. The method of claim 10, wherein at least one of the colored layers has a color selected from the group consisting of blue, green, blue-green, ice blue, and violet.

12. The system of claim 1, wherein the first translucent FRP colored layer has a spectrophotometric wavelength between about 370 nm and about 560 nm.

13. The system of claim 1, wherein the first translucent FRP colored layer has a spectrophotometric wavelength between about 560 nm and about 590 nm.

14. The system of claim 1, wherein the first translucent FRP colored layer has a spectrophotometric wavelength between about 590 nm and about 760 nm.

15. The system of claim 1, wherein the first translucent FRP colored layer has a color selected from the group consisting of spectral color shades from violet through green-yellow which may include blue, green, blue-green, ice blue, and violet.

16. The system of claim 1, wherein the first translucent FRP colored layer has a color selected from the group consisting of spectral color shades in the family of secondary and tertiary colors which may include pink, tan, amber, bronze, and desert rose.

17. The system of claim 1, wherein the second FRP layer is a translucent layer.

18. The system of claim 1, wherein the second FRP layer is colored.

19. The method of claim 6, wherein the dye comprises Jet Black Lake and Pond Dye.

20. The system of claim 1, wherein the third FRP layer is a translucent layer.

21. The system of claim 1, wherein the third FRP layer is colored.

* * * * *